(12) United States Patent
Martin et al.

(10) Patent No.: US 9,390,114 B2
(45) Date of Patent: Jul. 12, 2016

(54) SINGLE PAGE FORUM VIEWS

(71) Applicant: Verifyle, Inc., Saratoga, CA (US)

(72) Inventors: Roy Martin, Saratoga, CA (US);
Thomas M. Root, Scottsdale, AZ (US);
Aaron M. Scarisbrick, Boise, ID (US);
Stephen Pierce, Milpitas, CA (US)

(73) Assignee: Verifyle, Inc., Saratoga, CA (US)

( * ) Notice: Subject to any disclaimer, the term of this patent is extended or adjusted under 35 U.S.C. 154(b) by 408 days.

(21) Appl. No.: 13/922,444

(22) Filed: Jun. 20, 2013

(65) Prior Publication Data

US 2014/0379760 A1    Dec. 25, 2014

(51) Int. Cl.
| | |
|---|---|
| *G06F 17/30* | (2006.01) |
| *G06F 7/00* | (2006.01) |
| *G06F 3/0482* | (2013.01) |
| *G06F 3/0484* | (2013.01) |
| *G06Q 10/10* | (2012.01) |

(52) U.S. Cl.
CPC ........ *G06F 17/30315* (2013.01); *G06F 3/0482* (2013.01); *G06F 3/04842* (2013.01); *G06Q 10/10* (2013.01); *G06F 17/30675* (2013.01); *G06F 17/30716* (2013.01); *G06F 17/30864* (2013.01)

(58) Field of Classification Search
USPC .......................................................... 707/805
See application file for complete search history.

(56) References Cited

U.S. PATENT DOCUMENTS

| | | | |
|---|---|---|---|
| 7,788,126 B2 | 8/2010 | Wagner et al. | |
| 2007/0078881 A1* | 4/2007 | Vignet .................. | G06F 17/245 |
| 2011/0107088 A1* | 5/2011 | Eng ........................ | G06Q 10/10 |
| | | | 713/155 |
| 2012/0096389 A1* | 4/2012 | Flam ................... | G06F 17/3089 |
| | | | 715/777 |
| 2013/0029306 A1* | 1/2013 | Pulyassary ............... | G09B 7/02 |
| | | | 434/322 |

FOREIGN PATENT DOCUMENTS

WO    WO-2014205379 A1    12/2014

OTHER PUBLICATIONS

"International Application Serial No. PCT/US2014/043465, International Preliminary Report Patentability mailed Dec. 30, 2015", 8 pgs.
"International Application Serial No. PCT/US2014/043465, International Search Report mailed Oct. 31, 2014", 2 pgs.
"International Application Serial No. PCT/US2014/043465, Written Opinion mailed Oct. 31, 2014", 6 pgs.

\* cited by examiner

*Primary Examiner* — Kuen Lu
(74) *Attorney, Agent, or Firm* — Schwegman Lundberg & Woessner, P.A.

(57) ABSTRACT

Managing communications relationships may be accomplished by organizing a plurality of information elements and a plurality of users into a forum, with the forum being a virtual data structure organizing a plurality of single page views. Each single page view is organized into columns, with each column having a home row, a header row, and an action row. The header row indicates a title of the column for each of the columns of a single page view, and the action row indicates one or more commands available for execution for the each column of the single page view. The home row is the same for every column of each of the single page views and includes a selectable area that, upon selection by a user, navigates to a single page view associated with a home page view. Actions may be performed on information elements in columns of selected single page views.

23 Claims, 32 Drawing Sheets

| HOME ROW 310 | GUEST FORUM TITLE 1100 | | "LOGOUT" |
|---|---|---|---|
| "WORK SETS" | "DOCUMENTS" | "DATES" | "CONVERSATIONS" |
| | "VIEW" | "VIEW" | "VIEW" |
| WORK GROUPS LIST 1102 | DOCUMENTS LIST 1104 | DATES LIST 1106 | CONVERSATIONS LIST 1108 |
| "SUBMIT TO HOST" | "DOCUMENTS TO HOST" | "DATES TO HOST" | "CONVERSATIONS WITH HOST" |
| ACTION ROW | "ADD REMOVE VIEW" | "ADD REMOVE VIEW" | "ADD REMOVE VIEW" |
| | DOCUMENT SUBMISSION AREA 1110 | DATE SUBMISSION AREA 1112 | CONVERSATION SUBMISSION AREA 1114 |
| FOOTER 308 | | | |

*FIG. 11*

SINGLE PAGE FORUM VIEWS

TECHNICAL FIELD

This document generally relates to methods and systems for managing business process communication relationships. More specifically, this document relates to single page forum views.

BACKGROUND

Business process communication relationships involve the exchange of ideas and documents about, and the coordination of efforts of people involved in, business processes. Business processes are often anchored by documents that embody critical information. Tracking the exchange of such documents (and their revisions) and coordinating the efforts of the people involved in the business processes can become complex and difficult. Typically, the exchange of documents begins by sending email attachments; however, this quickly spreads across a collection of software categories including email, document management, calendars, customer relationship management (CRM), virtual data rooms (VDRs), business process management, cloud storage, text messaging, social networks, computer files and folders, and more.

Even just tracking email attachments used to exchange different documents from different people can be difficult. There is no map that shows and controls who has access to what documents or what documents each person has. Even if one were to implement a system to get a handle on email attachments, coordinating the people and information in a business process can span disconnected systems and tools. As a result, users are left with a fuzzy and incomplete overview of their processes and information exchanges.

BRIEF DESCRIPTION OF DRAWINGS

The present disclosure is illustrated by way of example and not limitation in the figures of the accompanying drawings, in which like references indicate similar elements and in which:

FIG. 11 is a diagram illustrating an example format of a guest forum page, in accordance with an example embodiment.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, each individual may be presented with a single home page that organizes a list of communication relationships and/or business processes. Each communication relationship and/or business process can be individually managed through a single forum page per process. A forum is a virtual structure that makes it simple for a user (host) to exchange documents with, and coordinate the efforts of, other people (guests) involved in a business process. The delivery of information may be managed and coordinated dynamically by updating the one-page view delivered to each guest in order to remain consistent with what the host specifies.

In an example embodiment, a single username and password (or other security mechanism) accesses the single home page. As such, a user need only utilize a single set of security credentials in order to manage all communication relationships and/or business processes he or she has access to.

Figure 1:
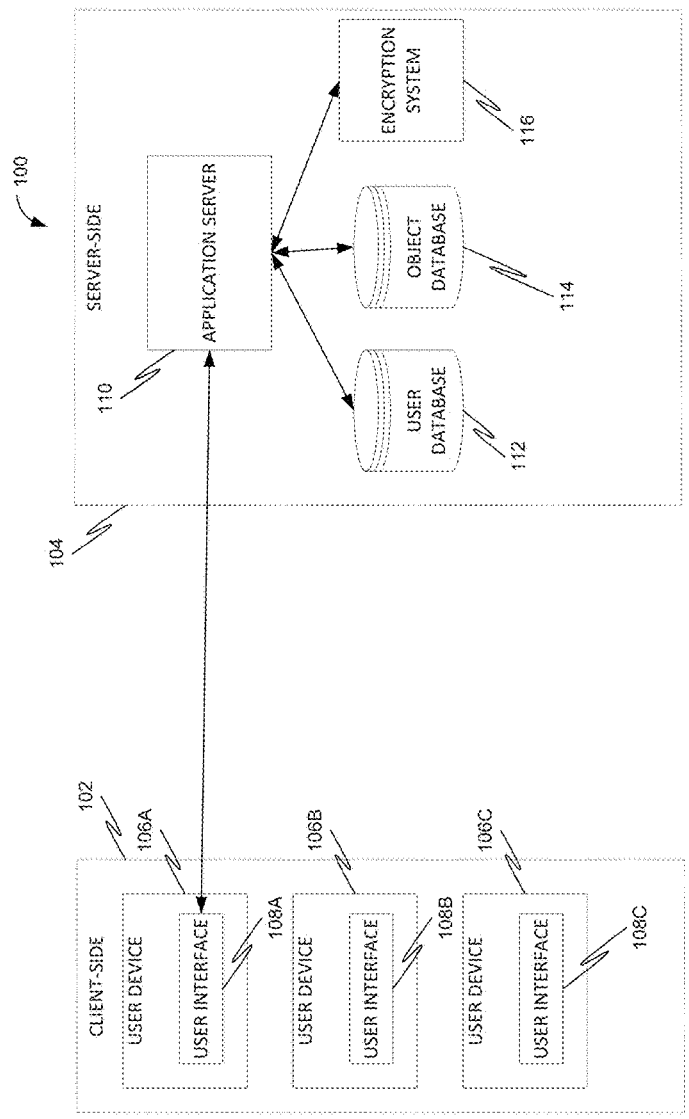
FIG. 1 is a block diagram illustrating a system, in accordance with an example embodiment, of presenting single page forum views.

FIG. 1 is a block diagram illustrating a system, in accordance with an example embodiment, of presenting single page forum views. The system 100 may be divided into a client-side 102 and a server-side 104. The client-side 102 may include one or more user devices 106A, 106B, 106C, each having its own user interface 108A, 108B, 108C. In an example embodiment, the user interface 108A, 108B, 108C may be a web browser or a dedicated application running on user device 106A, 106B, 106C. The server-side 104 may include an application server 110, a user database 112, an object database 114, and an encryption system 116. The application server 110 may respond to user interactions via the user interfaces 108A, 108B, 108C to present proper views of one or more forums. This may include, as described previously and described in more detail below, presenting information in a single page. Information about users (hosts and guests) may be stored in the user database 112. Information about objects (e.g., groups, documents, dates, conversations, etc.) may be stored in the object database 114. An encryption system 116 may act to encrypt the information so that only users with proper access rights can access particular forums/objects.

As described above, in an example embodiment, a single home page is delivered to each individual. Users are then able to understand the full gamut of information exchanged with everyone they choose to work with. A single page may be presented to each host to control the communication relationships of each forum they host. Each guest may be delivered a single page for each of the host's forums that the guest has been invited to join. Every user is then able to see, on their home page, a list of all the one-page views into the forums they host and all of the one-page views into forums in which they are guests.

A forum can include and coordinate all people involved in a process, all of the information elements (e.g., groups, documents, dates, conversations, etc.), and an intuitive way to display and control permissions for individuals to view or contribute data elements. Each person can work within a single page view into a forum to exchange and access information.

There may be three row categories in the pages delivered to users: the global (home) row, the header row, and the action row. The global (home) row may permit navigation to the home page from anywhere in the system. The header row may contain the title of each column and support the active column method of control. The action row contains column-specific actions and permits the user to take actions on column items.

Navigation in the application may be easily accomplished. All global pages and forums may be listed on the home page. Users are only a single click away from the home page. From the home page, a user may access a specific guest forum, host forum, or global page. To navigate from a global page or a forum to a different global page or forum, the user need only click home and then choose the desired global page or forum.

A members page may show a complete list of a host's members or "global guests." They may not be invited guests of a forum, but they are global in the sense that members are available from any host forum via an add guest function. From the members page, members can be added to the list, and member information can be viewed and edited. When a host adds a member who is also a host, the former host is dynamically added to the latter's member list.

A library page may list global documents. From this page, a host can upload and then view documents. These documents can be made available from any host forum via the add documents function.

A host forum page may provide a mechanism for the forum host to view, coordinate, and contribute to the content of a forum. This content includes other participants in the forum (guests), and various forms of information (documents, dates, conversations, etc.), all of which may be organized into a single screen in columnar format.

A forum host may control the participation of guests by adding them to or removing them from a forum. When a host adds a guest to a forum or removes a guest from a forum, the forum can be dynamically added to or removed from the home page of the guest. A host likewise can control guest access to forum items from the host forum page.

Within the host forum page, an "active column" method of control may provide a point of reference around an active column. Each column may have a column header. Clicking on the column header can activate the associated column. When a column of the host forum page is activated, several changes may occur. The actions that can be applied to the active columns items may be displayed in the column's action row. Additionally, unrelated columns may be grayed, and permission for the selected item in the active column may be indicated in related columns. Depending upon the particular active and related columns, the permission may be alterable.

A guest column in a host forum may list all of the guests that a host has added to the forum. From this column, the host can view and modify contact information and notes for each guest. The host can also assign guests access to any object in any other column by toggling checkboxes next to the objects. Thus, upon selecting a guest, a host can see on a single screen all of the documents, dates, conversations, and so forth that the guest has access to, and the host can give or remove access to any object with a single click.

A group acts as a nexus linking a selection of guests and a selection of documents. Guests can be granted access to groups and the groups can be granted access to documents, allowing for a complex coordination of groups that can be easily modified and does not involve redundant copies or transmission of data. This is fundamentally different from a hierarchical folder and offers significant advantages in terms of data and personnel management.

A documents column in a host forum can list all files that the host has added to the forum. All file types are allowed. A document can be moved to a forum from the library, from another forum, or via upload from the user's computer. When the documents column is active, guest access to a selected document can be indicated in the guests column by dots next to the guest names. Group access can likewise be indicated. Permissions can be altered by activating the guests column or the groups column as described above. However, the user can manage document permissions from the documents column in one particular way through the replace function.

A document can be replaced by any other document in the documents column. The result of a replace is that all access to the replaced document is revoked and those who had access to the replaced document are granted access to the replacement document. This facilitates document version control.

Each document can have an associated note. The note displays an editable message controlled by the host and viewable by any guest permitted to view the document. The note also can contain the date and time that each permitted guest first and last viewed the document.

A dates column may list the schedule items added to the forum. When this column is active, guest access to a selected date may be indicated by dots next to permitted guest names. Each date may have a title, a date or date range, and any accompanying information that the host chooses to include.

A conversation is a communication among a host and an arbitrary number of guests. A conversation may chronologically display all contributed messages as well as participants. While viewing a conversation, a user may add a message.

A guest's submission area may display the forum objects that have been submitted by forum guests to the forum host. The host and the submitting guest may be the only forum members who have access to a given submitted object. The host can copy any submitted object (e.g., document, date, conversation, etc.) from the guest submission area into the host forum area.

A forum guest may view a forum using a guest forum page. Using this page, it is simple for the forum guest to see groups, documents, dates, conversations, and the like that the forum guest is permitted to view. In addition, the forum guest page provides the ability for the forum guest to submit documents, dates, and conversations to the forum host.

A guest's view of a forum may be much like a host's, with a few exceptions. A guest's view may not include a guest's column (a guest does not necessarily know about any other forum guests). There may also be no checkboxes or dots in the guest forum because a guest does not control access to these objects. The host has provided the guest access to whatever is in the guest forum area. There may be checkboxes in the submission area. This area functions as an outbox. The guest may add and modify objects here before submitting them to the host. Upon toggling the checkbox next to an object, the host's access can be granted or revoked. Additionally, there may be no column activation in a guest's view of a forum. Any visible object can be selected directly. Furthermore, not all documents may be visible all the time. Only the documents of the selected group may be displayed, with 'all documents' being one of the system-defined groups.

Figure 2:
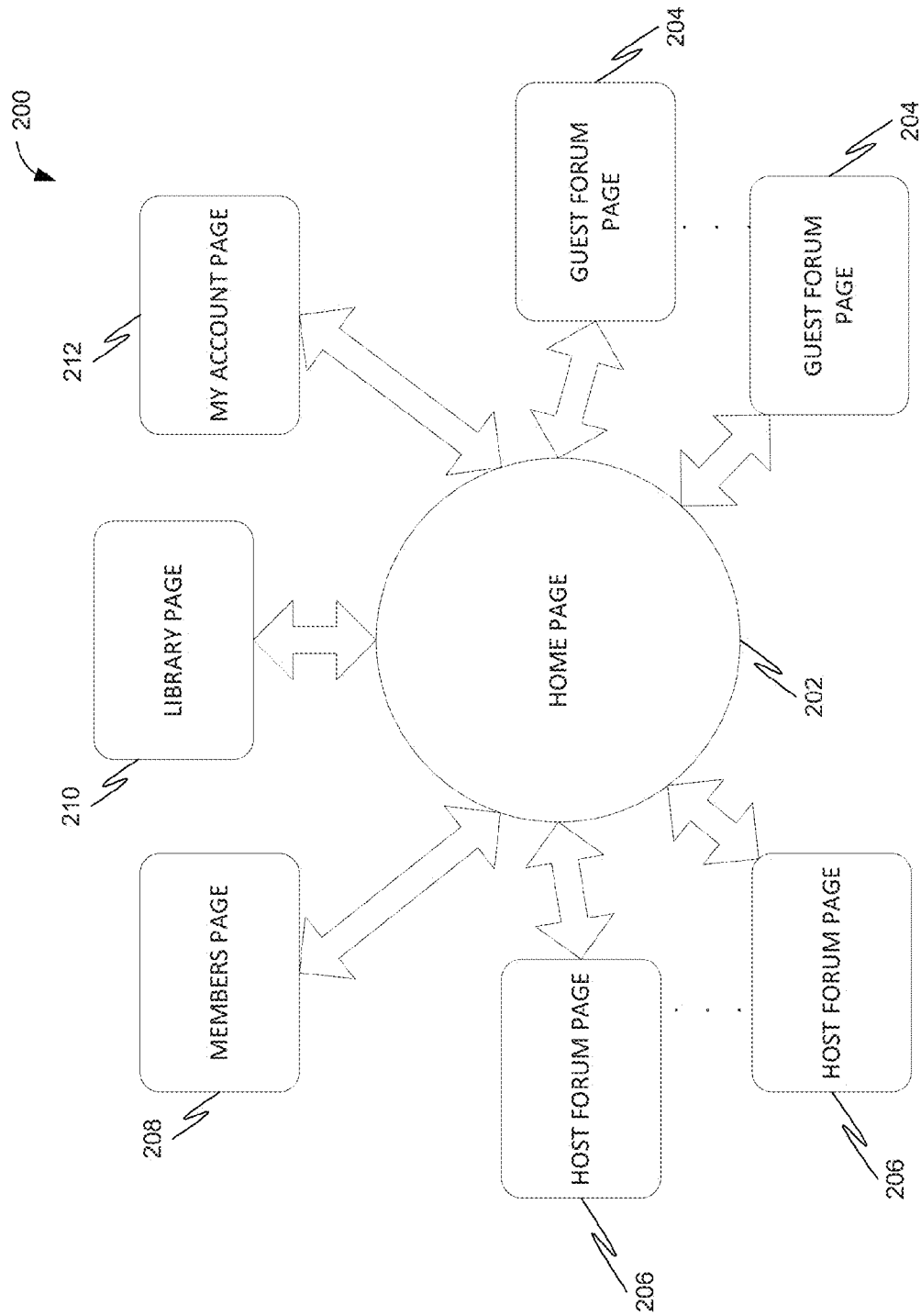
FIG. 2 is a diagram illustrating a method, in accordance with an example embodiment, of forum view navigation.

FIG. 2 is a diagram illustrating a method, in accordance with an example embodiment, of forum view navigation. This method 200 is expressed in terms of an application navigation map. A home page 202 may provide a base page from which a user may navigate directly to and from other pages 204, 206, 208, 210, 212. Rather than a page hierarchy, this results in an essentially flat navigational scheme where the home page 202 is accessible with one click from any other page 204, 206, 208, 210, 212. The pages 202, 204, 206, 208, 210, 212 will now be described in more detail.

Figure 3:
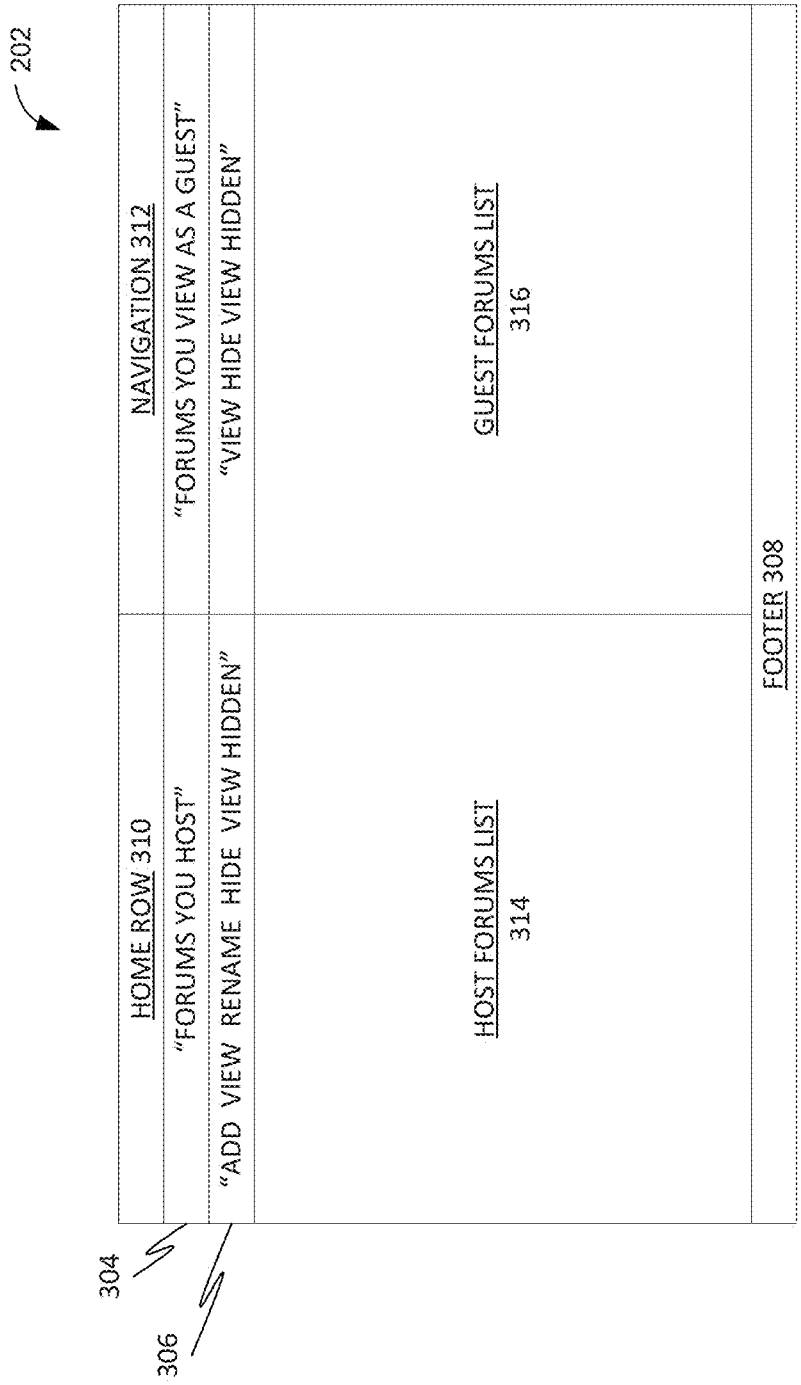
FIG. 3 is a diagram illustrating an example format of a home page, in accordance with an example embodiment.

FIG. 3 is a diagram illustrating an example format of a home page 202, in accordance with an example embodiment. When the user requests the home page 202 using the application, the user interface displays the elements (304-316) of the home page 202 without data. The user interface requests data from the application server to populate the elements of the home page 202. The user interface will either display the Host Forums List 314 if the user is a Host, or an upgrade panel if the user is a Guest.

When the user selects 'Add' from the Action Row 306 above the Host Forums List 314 on the home page 202, the user interface interacts with the user to gather information needed to create a new Forum. The user interface then makes a request to the application server to create the Forum.

When the user selects a Host Forum from the Host Forums List 314, and then clicks on 'View' from the Action Row 306 above the Host Forums List 314, the user interface displays the Host Forum Page (described below) for the selected Host Forum.

When the user selects a Host Forum from the Host Forums List 314, and then clicks on 'Hide' from the Action Row 306 above the Host Forums List 314, the user interface makes a request to the application server to mark the selected Forum as hidden. The user interface then refreshes the Host Forums List 314.

When the user selects a Host Forum from the Host Forums List 314, and then clicks on 'Rename' from the Action Row 306 above the Host Forums List 314, the user interface provides functions to rename the forum, as described in more detail below. Briefly, the user interface displays a dialog box for the user to input the new name, and makes a request to the application server to rename the Forum. The user interface then refreshes the Host Forums List 314.

When the user selects 'View Hidden' from the Action Row 306 above the Host Forums List 314, the user interface displays a dialog box with a list of hidden Forums. The user selects a Forum to unhide, and the user interface makes a request to the application server to make the selected Forum not hidden.

Figure 4:
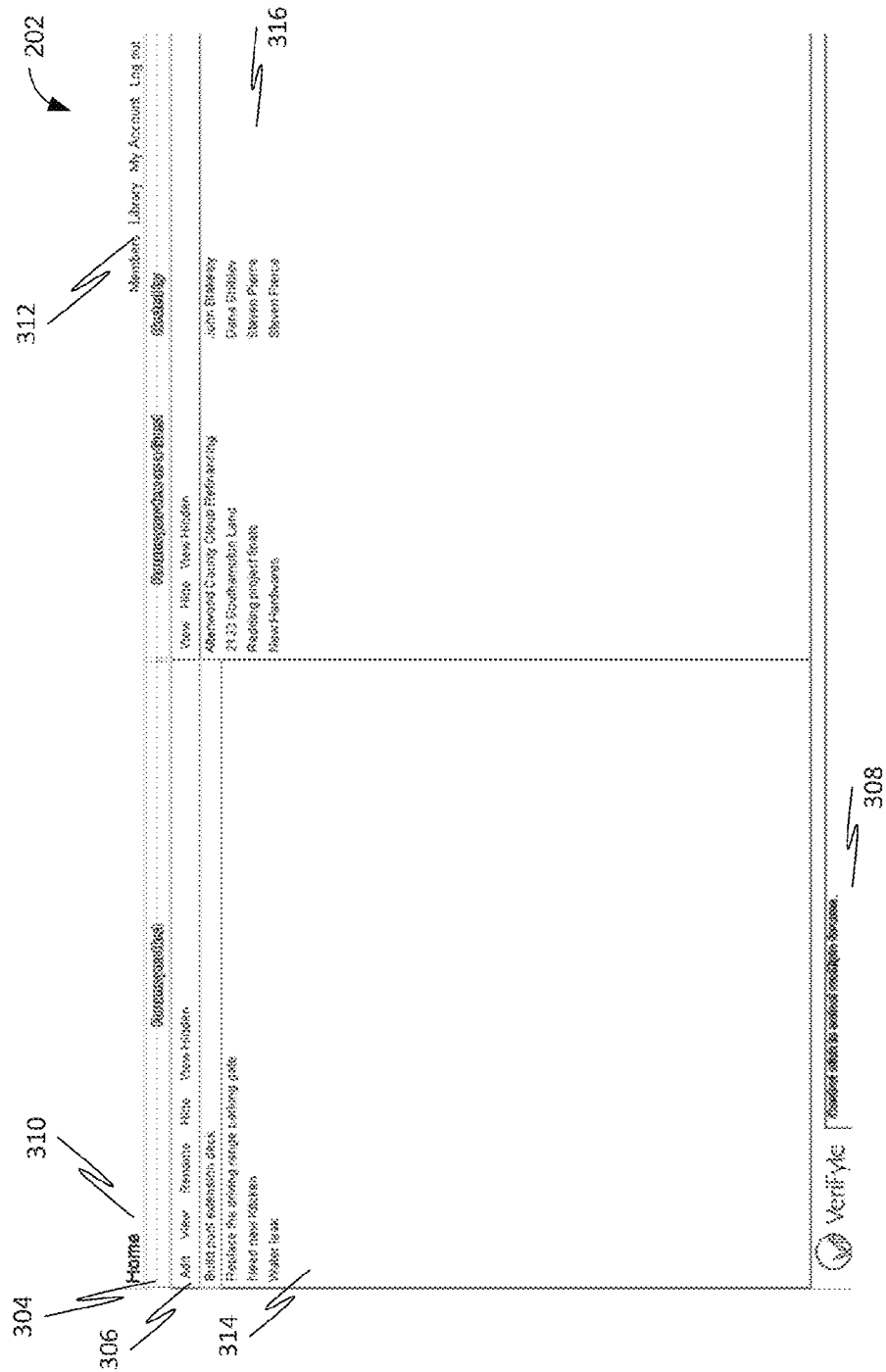
FIG. 4 is a screen capture illustrating, in accordance with an example embodiment, an example of the home page of FIG. 3 with actual data.

FIG. 4 is a screen capture illustrating, in accordance with an example embodiment, an example of the home page 202 of FIG. 3 with actual data.

Figure 5:
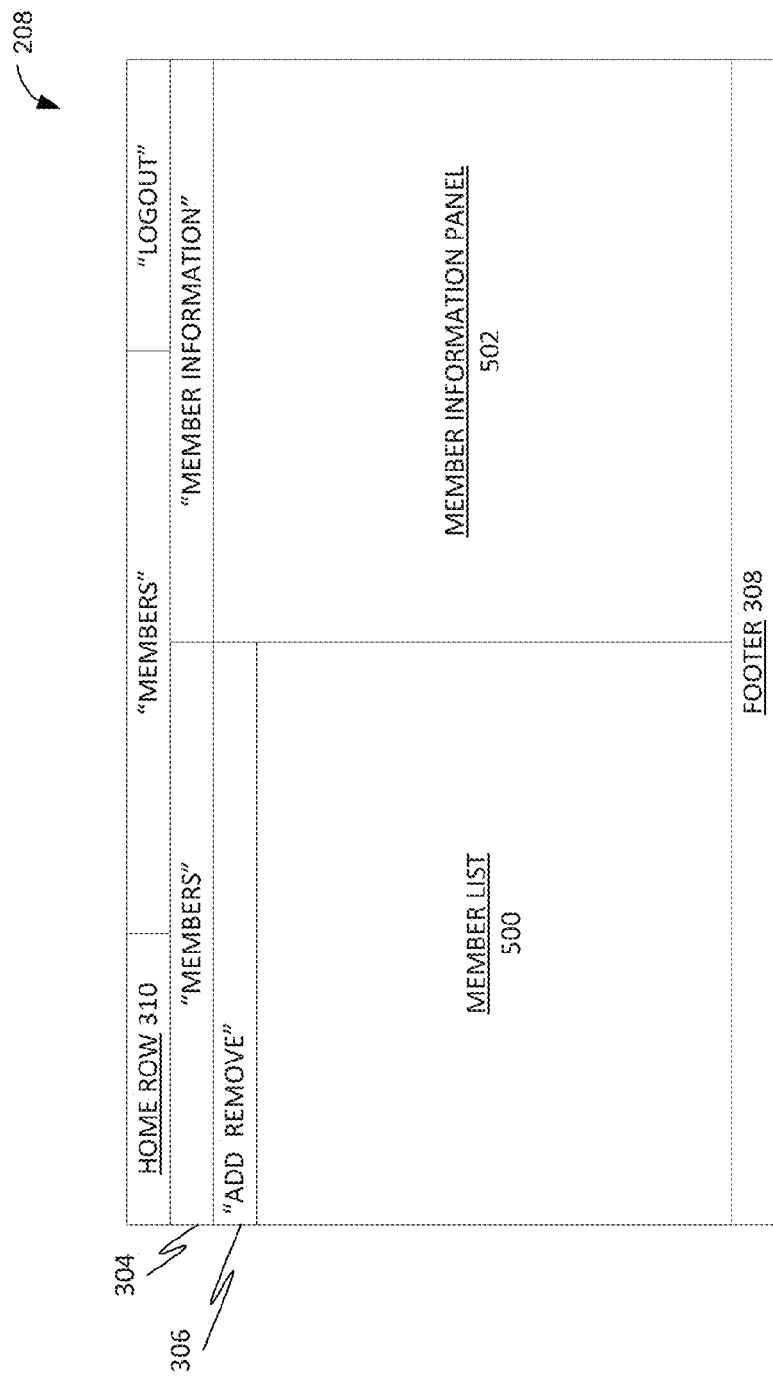
FIG. 5 is a diagram illustrating an example format of a members page, in accordance with an example embodiment.

FIG. 5 is a diagram illustrating an example format of a members page 208, in accordance with an example embodiment. When the user requests the members page 208 using the application, the user interface displays the elements (306-310, 500, 502) of the members page 208 without data. The user interface then requests data from the application server to populate the elements of the members page 208.

When the user selects 'Add' from the Action Row 306 above Member list 500 on the members page 208, the user interface interacts with the user to gather information on the user's new member, including the new member's email address. The user interface then makes a request to the application server to add the member to the user's Member list. The application server identifies the new member by email address.

When the user selects a member from the Member list 500, the user interface requests the member's information from the application server and populates Member Information Panel 502.

When the user has selected a member, and then clicks 'remove' from the Action Row 306 above Member list 500 on members page 208, the user interface makes a request to the application server for the member to be deleted from the user's Member list 500. The user interface then refreshes Member list 500.

Figure 6:
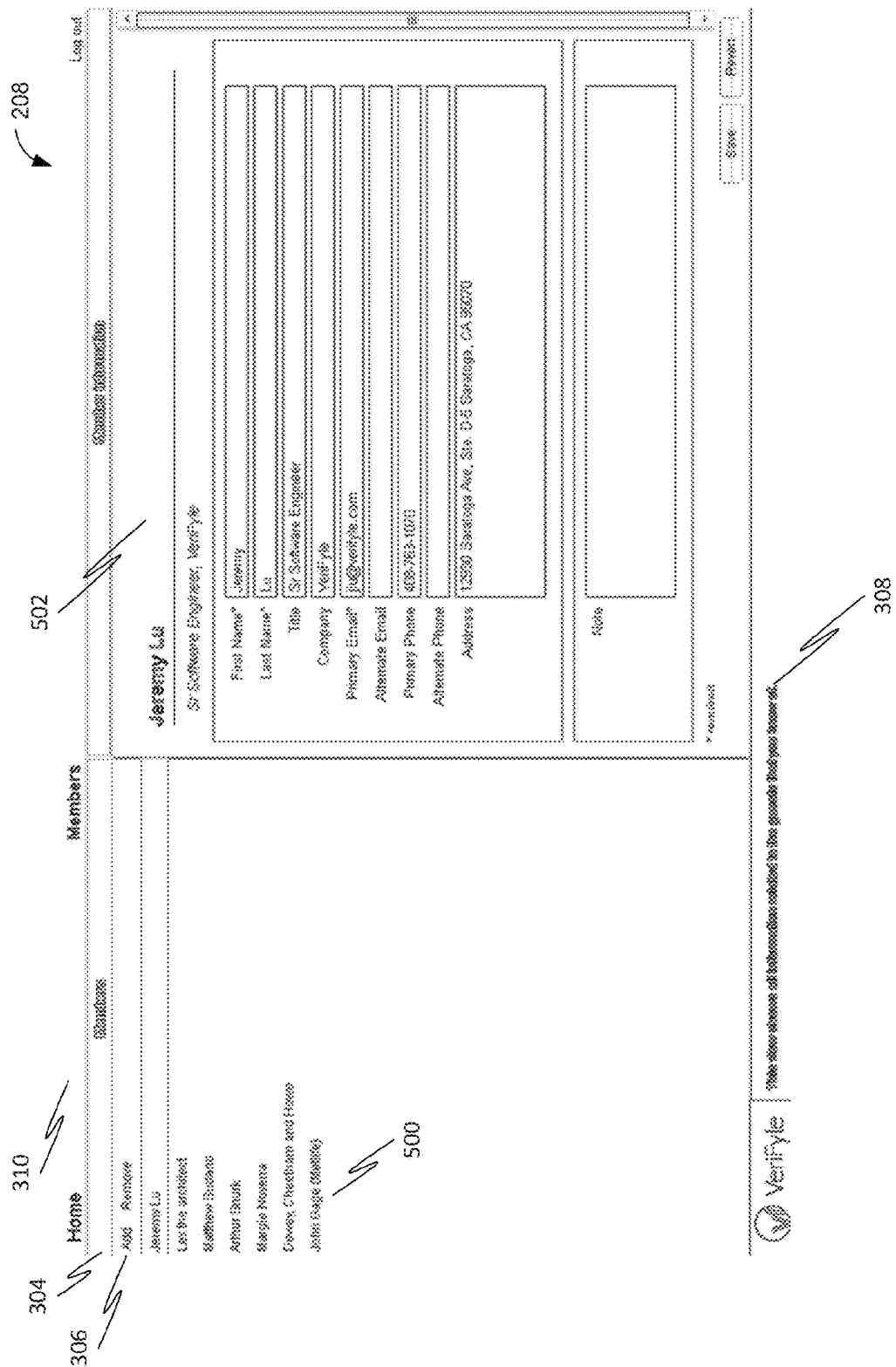
FIG. 6 is a screen capture illustrating, in accordance with an example embodiment, an example of the members page of FIG. 5 with actual data.

FIG. 6 is a screen capture illustrating, in accordance with an example embodiment, an example of the members page 208 of FIG. 5 with actual data.

Figure 7:
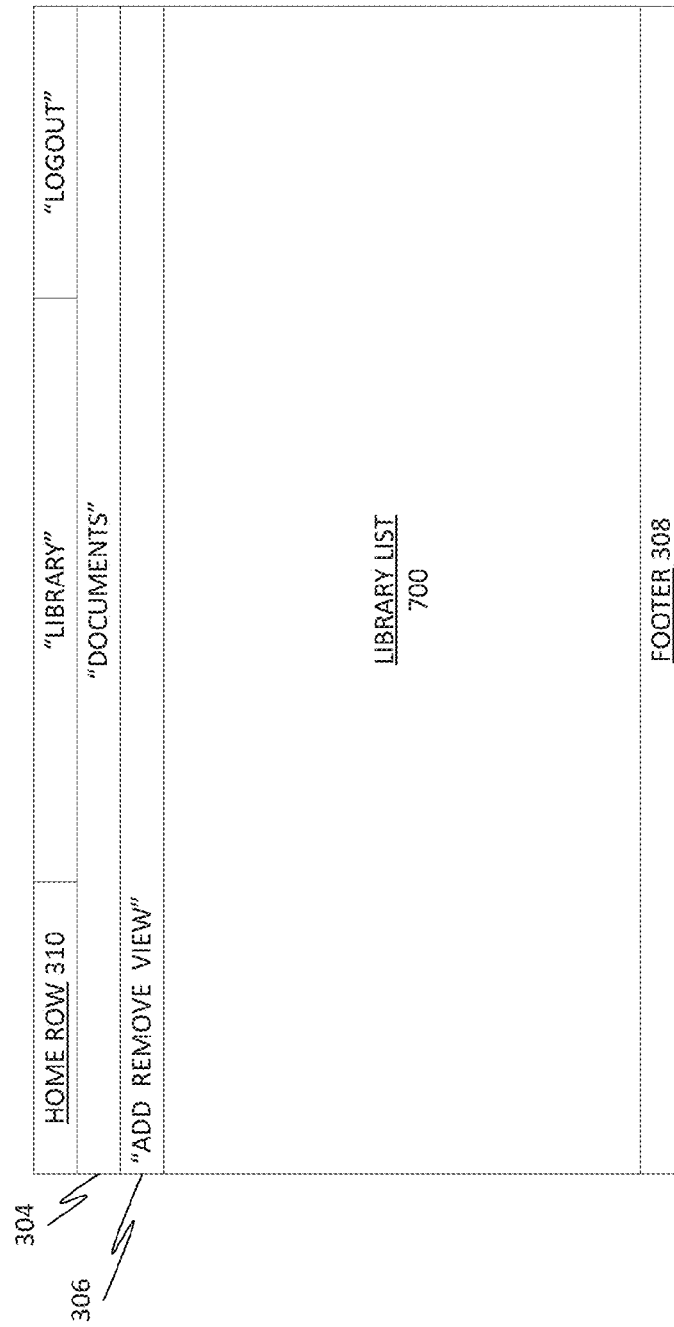
FIG. 7 is a diagram illustrating an example format of a library page, in accordance with an example embodiment.

FIG. 7 is a diagram illustrating an example format of a library page 210, in accordance with an example embodiment. When the user requests the library page 210 using the application, the user interface displays the elements (304-310, 700) of the library page 210 without data. The user interface then requests data from the application server to populate into the elements of library page 210.

When the user selects 'Add' from the Action Row 306 of the library page 210, the user interface interacts with the user to gather information on the user's new Library Document. The user interface then makes a request to the application server to add the new document to the user's Library.

When the user has selected a Library Document, and then clicks 'remove' from the Action Row 306 on the library page 210, the user interface makes a request to the application server for the document to be deleted from the user's Library. The user interface then refreshes Library List 700.

Figure 8:
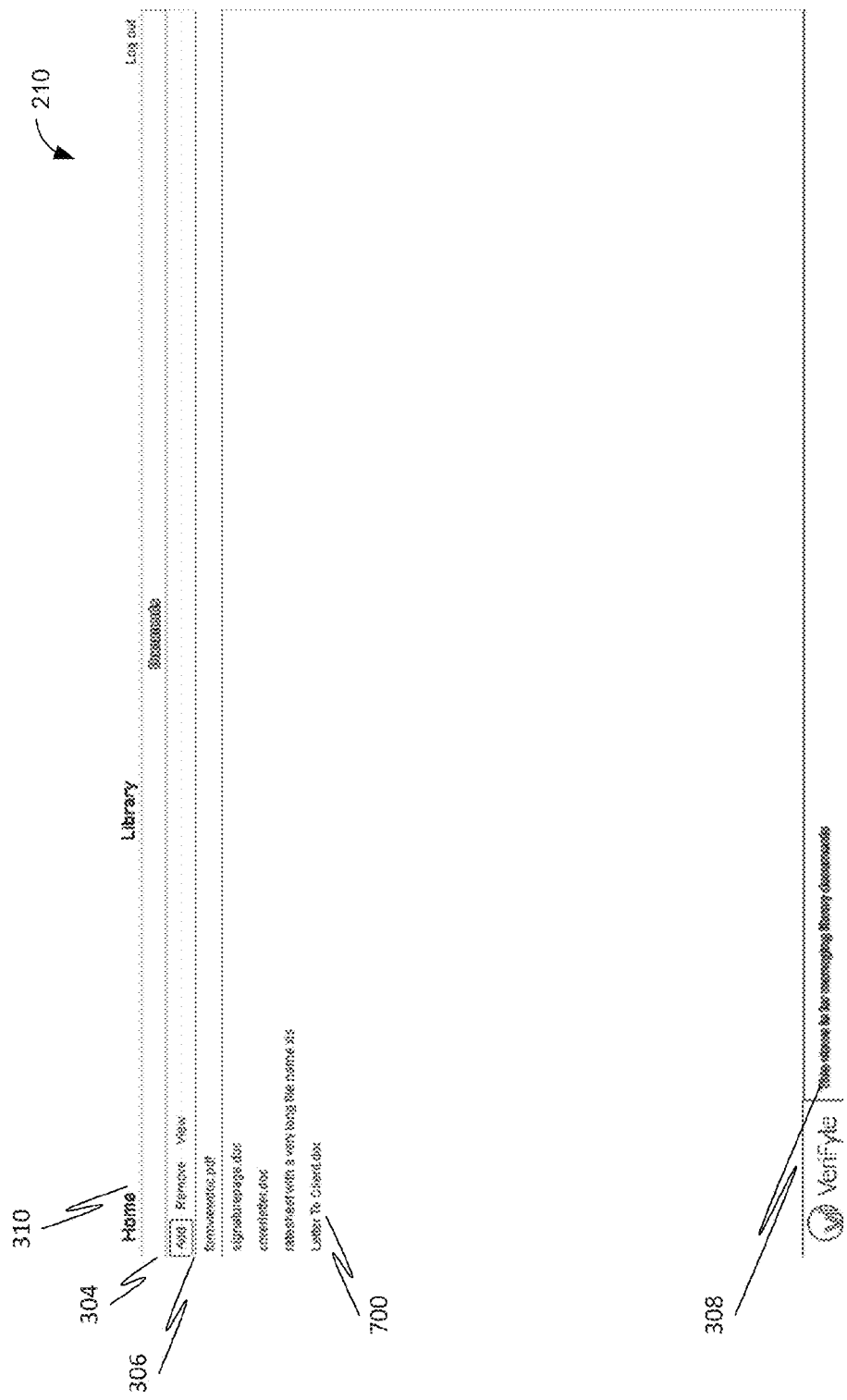
FIG. 8 is a screen capture illustrating, in accordance with an example embodiment, an example of the library page of FIG. 7 with actual data.

FIG. 8 is a screen capture illustrating, in accordance with an example embodiment, an example of the library page 210 of FIG. 7 with actual data.

Figure 9:
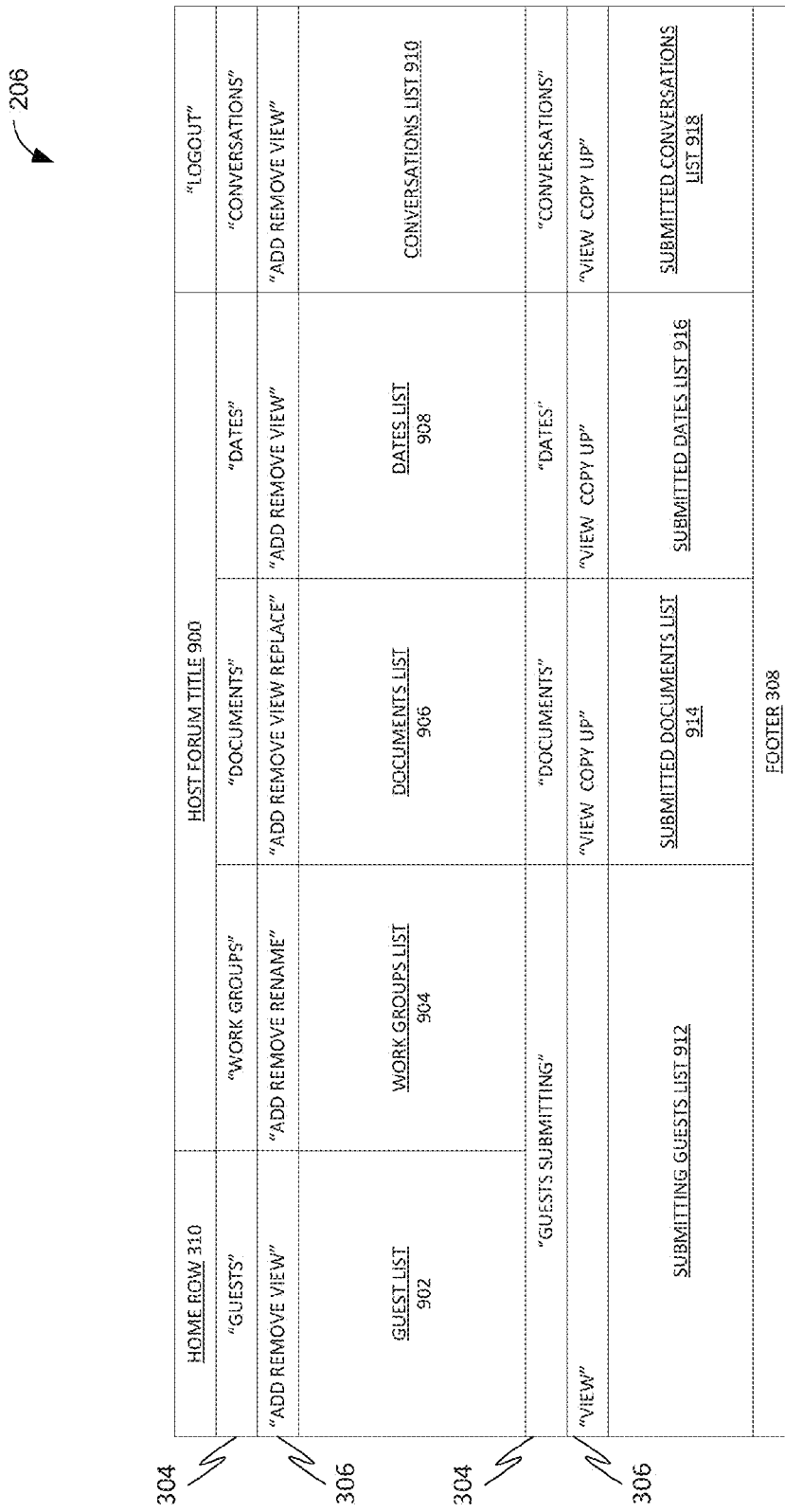
FIG. 9 is a diagram illustrating an example format of a host forum page, in accordance with an example embodiment.

FIG. 9 is a diagram illustrating an example format of a host forum page 206, in accordance with an example embodiment. When the user requests the host forum page 206 using the application, the user interface displays the elements (304-310, 900-918) of the host forum page 206 without data. The user interface then requests data from the application server to populate the elements of host forum page 206. The user interface activates the Guests Column and performs the actions appropriate to the Forum Column activation, as described below. The user interface also selects the first Forum Guest in the Submitting Guests List 912 and performs the actions appropriate to the Guests Submitting Column Guest selection, as described below.

When the user activates the Guests Column (by clicking on the header above Guest List 902), the user interface highlights the Guests Column and displays the appropriate actions (Add, Remove, View) in the Action Row 306. The user interface ungrays-out all (Guests, Groups, Documents, Dates, and Conversations) Columns. The user interface then selects the first Forum Guest and performs the actions appropriate to the Forum Guest selection, as described below.

When the user activates the Guests Column and selects a guest from Guest List 902, the user interface makes a request to the application server for permission information for that Guest. The application server responds with the information, and the user interface displays checkmarks and dots in the checkboxes next to each object (Groups, Documents, Dates, Conversations) to indicate which objects that Guest can access. Dots are used to indicate permissions granted via Groups, and checkmarks indicate permissions granted directly to the guest.

When the user activates the Guests Column and clicks on the 'Add' button within the Action Row 306 above Guest List 902, the user interface displays a dialog box containing the user's Member list. The user selects a member, and the user interface makes a request to the application server to add the selected member to the current Forum.

When the user activates the Guests Column, selects a guest from Guest List 902, and clicks on the 'Remove' button within the Action Row 306 above Guest List 902, the user interface makes a request to the application server to remove the selected guest from the current Forum.

When the user activates the Guests Column, selects a guest from Guest List 902, and clicks on the 'View' button within the Action Row 306 above Guest List 902, the user interface makes a request to the application server to retrieve information on the selected guest. The user interface then displays the information to the user.

When the user selects the Guests Column, selects a guest from Guest List 902, and clicks an empty checkbox for an encrypted object (e.g., Document, Conversation), the user interface makes a request to the application server to add a permission. The application server dynamically adds permission for the selected Guest to view the encrypted object. The user interface then refreshes the appropriate element of the host forum page 206, indicating the changed permissions.

When the user selects the Guests Column, selects a guest from Guest List 902, and clicks on an active (checked) checkbox for an encrypted object (Document, Conversation), the user interface makes a request to the application server to remove a permission. The application server dynamically removes permission for the selected guest to view the encrypted object. The user interface then refreshes the appropriate element of the host forum page 206, indicating the changed permissions.

When the user selects the Guests Column, selects a guest from Guest List 902, and clicks on an active (checked) checkbox for a Group, the user interface makes a request to the application server to remove the guest from the Group. The application server then dynamically removes permission for the Guest to view the encrypted objects that are part of the Group. The user interface then refreshes the appropriate element of host forum page 206, indicating the changed permissions.

When the user selects the Guests Column, selects a guest from Guest List 902, and clicks on an empty checkbox for a Group, the user interface makes a request to the application server to add the guest to the Group. The application server then dynamically adds permission for the Guest to view the encrypted objects that are part of the Group. The user interface then refreshes the appropriate element of the host forum page 206, indicating the changed permissions.

When the user selects the Guests Column, selects a guest from Guest List 902, and clicks on an empty checkbox for a Date, the user interface makes a request to the application server to permit the guest to view the Date. The user interface then refreshes the appropriate element of the host forum page 206, indicating the changed permissions.

When the user selects the Guests Column, selects a guest from Guest List 902, and clicks on an active (checked) checkbox for a Date, the user interface makes a request to the application server to disallow the guest to view the Date. The user interface then refreshes the appropriate element of the host forum page 206, indicating the changed permissions.

When the user activates the Groups Column (by clicking on the header row 304 above Groups List 904), the user interface highlights the Groups Column and displays the appropriate actions (Add, Remove, View) in the Action Row 306. The user interface also grays-out the Dates and Conversations columns. The user interface then selects the first Group, and performs the actions appropriate to the Group selection, as described below.

When the user selects a Group from Groups List 904, the user interface makes a request to the application server for information about that Group. The application server responds with the information and the user interface displays dots next to guests in the Guest List 902 and checkmarks next to documents in the Documents List 906 to indicate which documents and guests are part of the selected Group. Dots are used to indicate guests that are part of the Group, and checkmarks indicate documents that are part of the selected Group.

When the user activates the Groups Column, and clicks on the 'Add' button within the Action Row 306 above Groups List 904, the user interface displays a dialog box asking the user for the name of the new Group. The user inputs the name, and the user interface makes a request to the application server to add a new Group to the current Forum.

When the user activates the Groups Column, selects a Group, and clicks on the 'Remove' button within the Action Row 306 above Groups List 904, the user interface makes a request to the application server to remove the selected Group from the current Forum. The application server then dynamically removes permission for the Group Guests to view the encrypted Group Objects.

When the user activates the Groups Column, selects a Group, and clicks on an empty checkbox for a document, the user interface makes a request to the application server to add the document to the Group. The application server then dynamically adds permission for the Group Guests to view the encrypted objects that are part of the Group. The user interface then refreshes the appropriate element of the host forum page 206, indicating the changed permissions.

When the user activates the Groups Column, selects a Group, and clicks on an active (checked) checkbox for a document, the user interface makes a request to the application server to remove the document from the Group. The application server then dynamically removes permission for the Group Guests to view the encrypted Group Objects. The user interface then refreshes the appropriate element of the host forum page 206, indicating the changed permissions.

When the user activates the Documents Column (by clicking on the header above Documents List 906), the user interface highlights the Documents Column and displays the appropriate actions (Add, Remove, View, Replace) in the Action Row 306. The user interface also grays-out the Dates and Conversations columns. The user interface then selects the first document and performs the actions appropriate to the document selection, as described below.

When the user activates the Documents Column and selects a document, the user interface makes a request to the application server for information about the selected document. The application server then responds with the information. The user interface displays dots next to guests in the Guest List 902 and Groups in the Groups List 904. Dots are used to indicate guests that are permitted to view the selected Document, and to indicate Groups that the selected document is included in.

When the user activates the Documents Column and clicks on the 'Add' button within the Action Row 306 above Documents List 906, the user interface requests the new document. The user provides the document, and then the user interface makes a request to the application server to add a new document to the current Forum.

When the user activates the Documents Column, selects a Document, and clicks on the 'Remove' button within the Action Row 306 above Documents List 906, the user interface makes a request to the application server to remove the selected document from the current Forum. The application server then dynamically removes permission for the Forum Guests to view the encrypted document.

When the user activates the Documents Column, selects a document, and clicks on the 'View' button within the Action Row 306 above Documents List 906, the user interface makes a request to the application server to retrieve the selected document. The user interface then delivers the document to the user.

When the user activates the Documents Column, selects a document, and clicks on the 'Replace' button within the Action Row 306 above Documents List 906, the user interface displays a dialog with a list of the Forum Documents. The user selects a document to be the replacement document. The user interface then makes a request to the application server to replace the selected document with the replacement document.

When the user activates the Dates Column (by clicking on the header above Dates List 908), the user interface highlights the Dates Column and displays the appropriate actions (Add, Remove, View) in the Action Row 306. The user interface also grays-out the Groups, Documents and Conversations columns. The user interface then selects the first date, and performs the actions appropriate to the Date selection, as described below.

When the user selects a date, the user interface makes a request to the application server for information about that date. The application server responds with the information and the user interface displays diamonds next to guests in the Guests List 902 to indicate which guests have permission to view the selected date.

When the user activates the Dates Column and clicks on the 'Add' button within the Action Row 306 above Dates List 908, the user interface displays a dialog box asking the user for the information about the new date. The user inputs the information, and the user interface makes a request to the application server to add a new date to the current Forum.

When the user activates the Dates Column, selects a date, and clicks on the 'View' button within the Action Row 306 above Dates List 908, the user interface makes a request to the application server to retrieve information on the selected date. The user interface then displays the information to the user.

When the user activates the Dates Column, selects a date, and clicks on the 'Remove' button within the Action Row 306 above Dates List 908, the user interface makes a request to the application server to remove the selected date from the current Forum.

When the user activates the Conversations Column (by clicking on the header above Conversations List 910), the user interface highlights the Conversations Column and displays the appropriate actions (Add, Remove, View) in the Action Row 306. The user interface also grays-out the Groups, Documents and Dates columns. The user interface then selects the first conversation, and performs the actions appropriate to the Conversation selection, as described below.

When the user selects a conversation, the user interface makes a request to the application server for information about that conversation. The application server responds with the information, and the user interface displays dots next to guests in the Guests List to indicate which Guests have permission to view the selected conversation.

When the user activates the Conversations Column, and clicks on the 'Add' button within the Action Row 306 above Conversations List 910, the user interface displays a dialog box asking the user for the information about the new Conversation. The user inputs the information, and the user interface makes a request to the application server to add the new conversation to the current Forum.

When the user activates the Conversations Column, selects a conversation, and clicks on the 'View' button within the Action Row 306 above Conversations List 910, the user interface makes a request to the application server to retrieve information on the selected conversation. The user interface then displays the information to the user.

When the user activates the Conversations Column, selects a Conversation, and clicks on the 'Remove' button within the Action Row 306 above Conversations List 910, the user interface makes a request to the application server to remove the selected conversation from the current Forum.

When the user selects a Forum Guest from the Submitting Guests List 912, the user interface makes a request to the application server for information about the Forum Objects submitted by the selected Forum Guest. The application server responds with the information and the user interface displays the documents, dates and conversations submitted by the Forum Guest in the Submitted Documents List 914, the Submitted Dates List 916, and the Submitted Conversations List 918.

When the user selects a Forum Guest from the Submitting Guests List 912, selects a document from Submitted Documents List 914, and clicks on the 'View' button within the Action Row 306 above Submitted Documents List 914, the user interface makes a request to the application server to retrieve the selected document. The user interface then delivers the document to the user.

When the user selects a Forum Guest from the Submitting Guests List 912, selects a date from Submitted Dates List 916, and clicks on the 'View' button within the Action Row 306 above Submitted Dates List 916, the user interface makes a request to the application server to retrieve the selected date. The user interface then displays the date to the user.

When the user selects a Forum Guest from the Submitting Guests List 912, selects a conversation from Submitted Conversations List 918, and clicks on the 'View' button within the Action Row 306 above Submitted Conversations List 918, the user interface makes a request to the application server to retrieve the selected Conversation. The user interface then displays the conversation to the user.

When the user selects a Forum Guest from the Submitting Guests List 912, selects a document from Submitted Documents List 914, and clicks on the 'Copy Up' button within the Action Row 306 above Submitted Documents List 914, the user interface makes a request to the application server to copy the selected document into the Host Forum.

When the user selects a Forum Guest from the Submitting Guests List 912, selects a date from Submitted Dates List 916, and clicks on the 'Copy Up' button within the Action Row 306 above Submitted Dates List 916, the user interface makes a request to the application server to copy the selected date into the Host Forum.

When the user selects a Forum Guest from the Submitting Guests List 912, selects a conversation from Submitted Conversations List 918, and clicks on the 'Copy Up' button within the Action Row 306 above Submitted Conversations List 918, the user interface makes a request to the application server to copy the selected conversation into the Host Forum.

Figure 10:
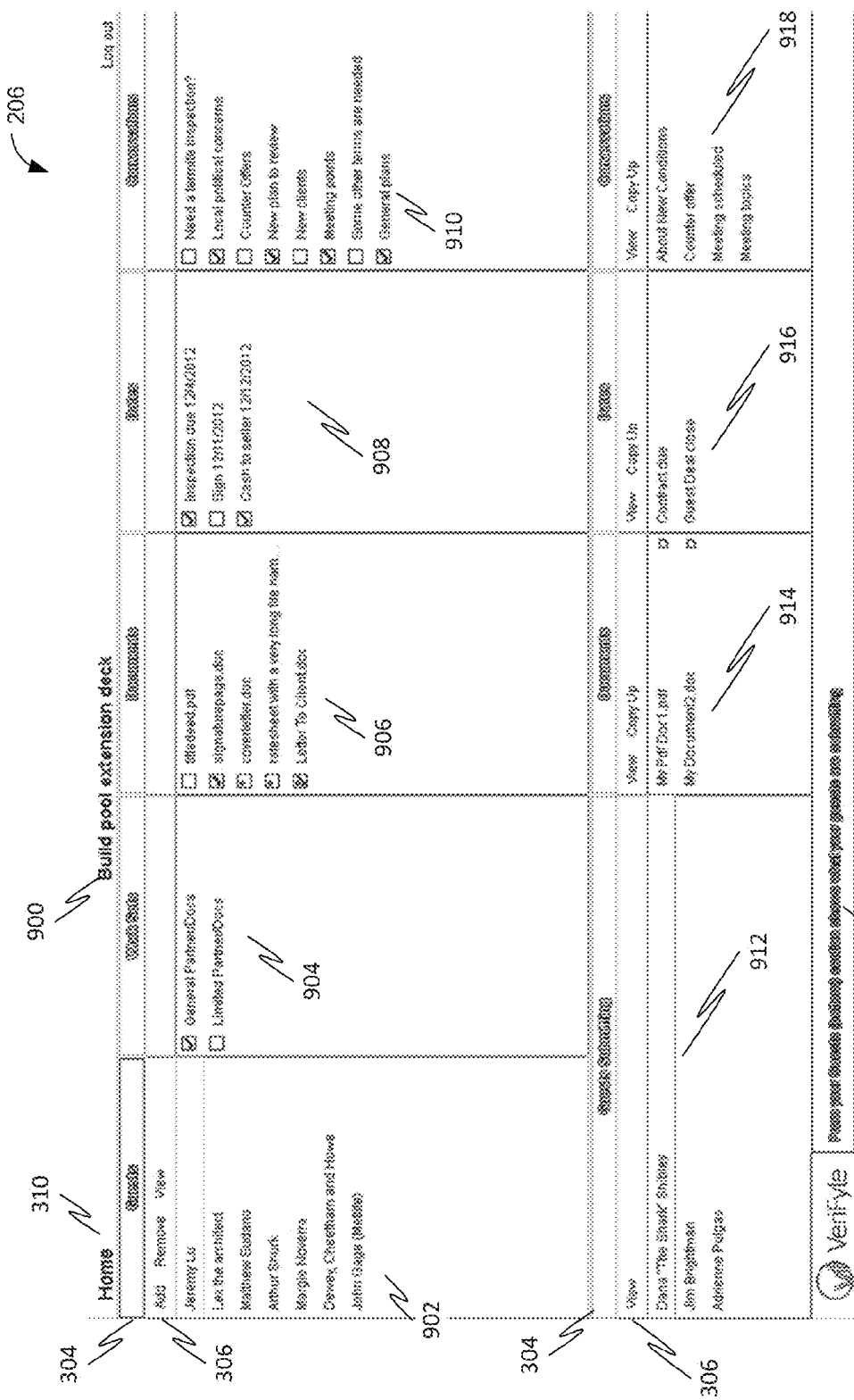
FIG. 10 is a screen capture illustrating, in accordance with an example embodiment, an example of the host forum page of FIG. 9 with actual data.

FIG. 10 is a screen capture illustrating, in accordance with an example embodiment, an example of the host forum page 206 of FIG. 9 with actual data.

FIG. 11 is a diagram illustrating an example format of a guest forum page 204, in accordance with an example embodiment. When the user requests the guest forum page 204 using the application, the user interface displays the elements (304-310, 1100-1114) of the guest forum page 204 without data. The user interface then requests data from the application server to populate the data into the elements of the guest forum page. The user interface selects the first Group in Groups List 1102 and performs the actions appropriate to the Group selection, as described below.

When the user selects a Group from the Groups List 1102, the user interface makes a request to the application server to retrieve a list of Documents, Dates and Conversations that the guest is permitted to view that belong to the selected Group. The user interface then populates Documents List 1104, Dates List 1106 and Conversations List 1108 with the objects that the guest is permitted to view.

When the user selects a document from the Documents List 1104, and then clicks on the 'View' button from the Action Row 306 above the item, the user interface makes a request to the application server to retrieve the selected document. The user interface then delivers the document to the user.

When the user selects a date from the Dates List 1106 and then clicks on the 'View' button from the associated specific Action Row 306, the user interface makes a request to the application server for the information regarding the selected date. The user interface displays the date to the user.

When the user selects a conversation from the Conversations List 1108, and then clicks on the 'View' button from the Action Row 306 above the item, the user interface makes a request to the application server to retrieve the selected conversation. The user interface then displays the conversation to the user.

When the user clicks on 'Add' from the Action Row 306 above the Document Submission Area 1110, the user interface requests the user for the new document. The user provides the document, then the user interface makes a request to the application server to add the new document to the Guest Submission area of the Guest Forum.

When the user clicks on 'Add' from the Action Row 206 above the Date Submission Area 1112, the user interface displays a dialog box asking the user for the information about the new date. The user inputs the information, and the user interface makes a request to the application server to add the new date to the Guest Submission area of the Guest Forum.

When the user clicks on 'Add' from the Action Row 206 above the Conversation Submission Area 1114, the user interface displays a dialog box asking the user for the information about the new conversation. The user inputs the information, and the user interface makes a request to the application server to add the new conversation to the Guest Submission area of the Guest Forum.

When the user selects a document from the Document Submission Area 1110 and clicks on 'Remove' from the Action Row 306 above the Document Submission Area 1110, the user interface makes a request to the application server to remove the selected document from the Guest Submission area of the Guest Forum.

When the user selects a date from the Date Submission Area 1112 and clicks on 'Remove' from the Action Row 306 above the Date Submission Area 1112, the user interface makes a request to the application server to remove the selected date from the Guest Submission area of the Guest Forum.

When the user selects a conversation from the Conversation Submission Area 1114 and clicks on 'Remove' from the Action Row 306 above the Conversation Submission Area 1114, the user interface makes a request to the application server to remove the selected conversation from the Guest Submission area of the Guest Forum.

When the user selects a document from the Document Submission Area 1110 and clicks on 'View' from the Action Row 306 above the Document Submission Area 1110, the user interface makes a request to the application server to retrieve the selected document from the Guest Submission area of the Guest Forum. The user interface delivers the document to the user.

When the user selects a date from the Date Submission Area 1112 and clicks on 'View' from the Action Row 306 above the Date Submission Area 1112, the user interface makes a request to the application server to retrieve the selected date from the Guest Submission area of the Guest Forum. The user interface displays the date to the user.

When the user selects a conversation from the Conversation Submission Area 1114 and clicks on 'View' from the Action Row 306 above the Conversation Submission Area 1114, the user interface makes a request to the application server to retrieve the selected conversation from the Guest Submission area of the Guest Forum. The user interface displays the conversation to the user.

When the user clicks on an active (checked) checkbox for a document within the Document Submission Area 1110, the user interface makes a request to the application server to remove permission for the Forum Host to view the document. The application server dynamically removes permission for the Forum Host to view the document. The user interface then refreshes the appropriate element of the guest forum page 204, indicating the changed permissions.

When the user clicks on an active (checked) checkbox for a date within the Date Submission Area 1112, the user interface makes a request to the application server to remove permission for the Forum Host to view the date. The user interface then refreshes the appropriate element of the guest forum page 204, indicating the changed permissions.

When the user clicks on an active (checked) checkbox for a conversation within the Conversation Submission Area 1114, the user interface makes a request to the application server to remove permission for the Forum Host to view the conversation. The application server dynamically removes permission for the Forum Host to view the conversation. The user interface then refreshes the appropriate element of the guest forum page 204, thereby indicating the changed permissions.

When the user clicks on an empty checkbox for a document within the Document Submission Area 1110, the user interface makes a request to the application server to add a permission for the Forum Host to view the document. The application server dynamically adds permission for the Forum Host to view the document. The user interface then refreshes the appropriate element of the guest forum page 204, indicating the changed permissions.

When the user clicks on an empty checkbox for a date within the Date Submission Area 1112, the user interface makes a request to the application server to add a permission for the Forum Host to view the date. The user interface then refreshes the appropriate element of the guest forum page 204, indicating the changed permissions.

When the user clicks on an empty checkbox for a conversation within the Conversation Submission Area 1114, the user interface makes a request to the application server to add a permission for the Forum Host to view the conversation. The application server dynamically adds permission for the Forum Host to view the conversation. The user interface then refreshes the appropriate element of the guest forum page 204, indicating the changed permissions.

Figure 12:
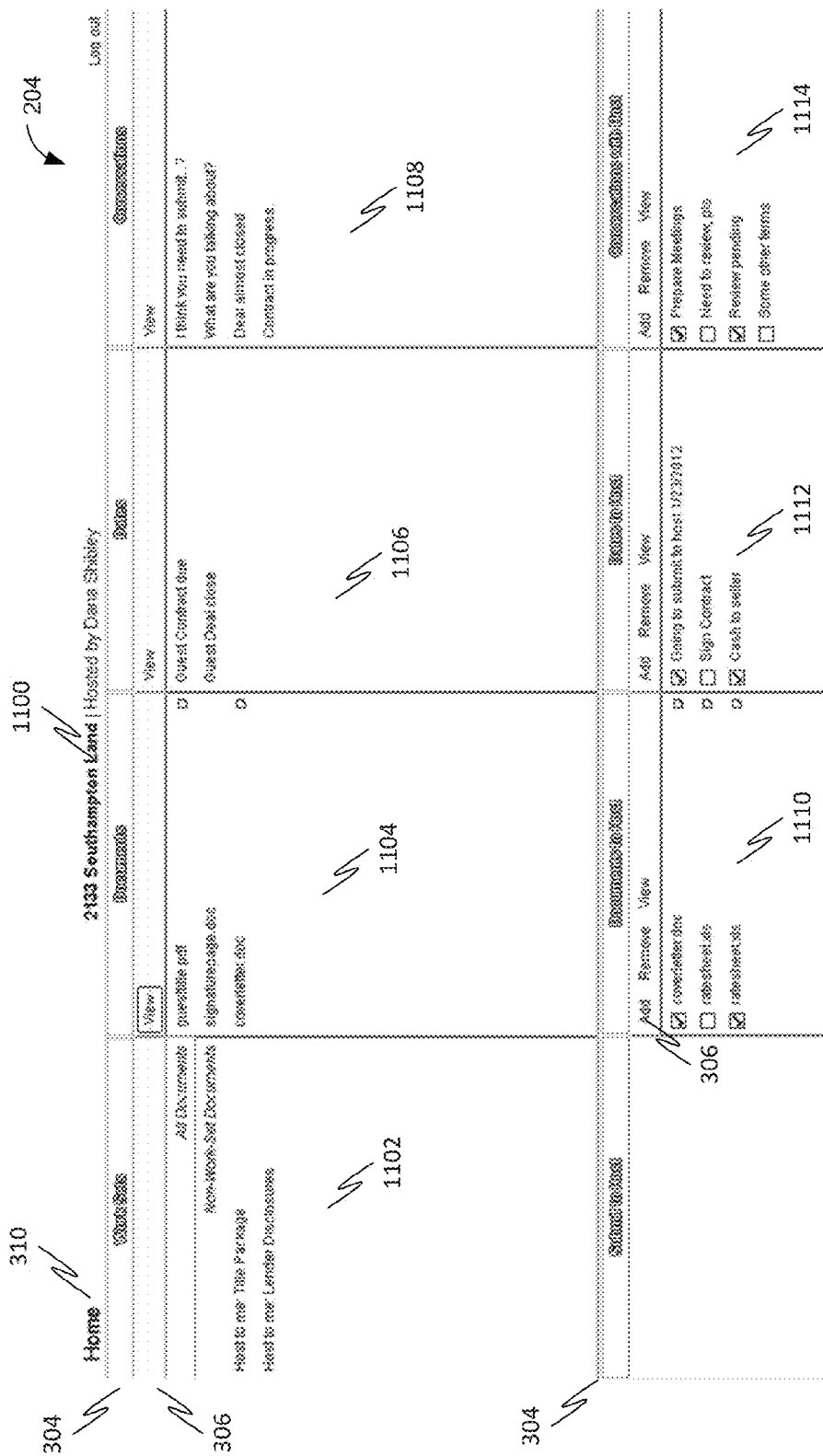
FIG. 12 is a screen capture illustrating, in accordance with an example embodiment, an example of the guest forum page of FIG. 11 with actual data.

FIG. 12 is a screen capture illustrating, in accordance with an example embodiment, an example of the guest forum page 204 of FIG. 12 with actual data.

Figure 13:
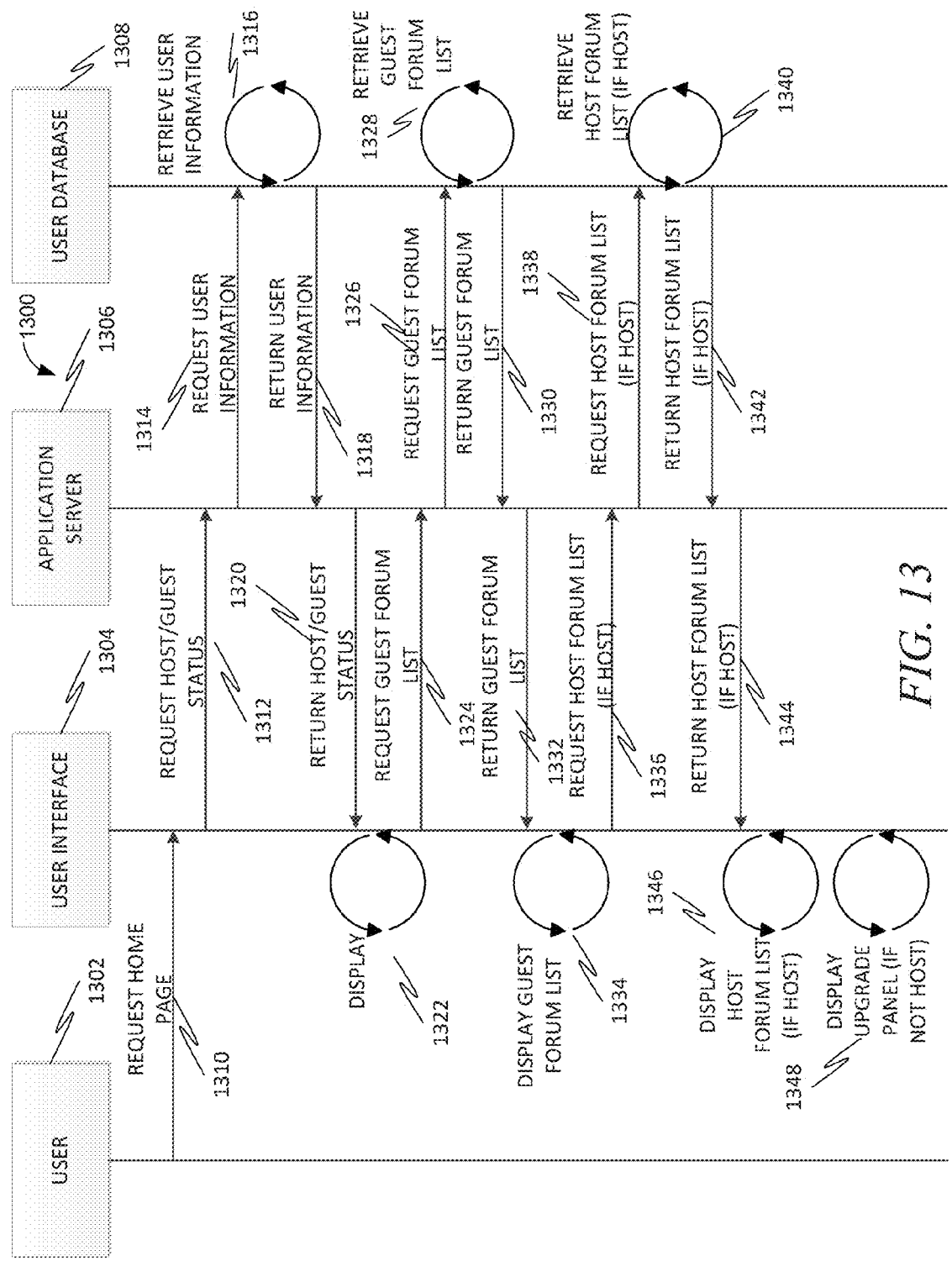
FIG. 13 is an interaction diagram illustrating a method, in accordance with an example embodiment, of presenting a home page.

The processes described above will now be presented in the form of interaction diagrams illustrating various processes. It should be noted that these are merely illustrative examples of processes that can be used to produce the results described above, and that other processes not explicitly mentioned may be used. FIG. 13 is an interaction diagram illustrating a method 1300, in accordance with an example embodiment, of presenting a home page. The method 1300 utilizes a user 1302, user interface 1304, application server 1306, and user database 1308. At operation 1310, the user 1302 requests a home page from the user interface 1304. At operation 1312, the user interface 1304 requests host and guest status from the application server 1306. At operation 1314, the application server 1306 requests user information from the user database 1308. At operation 1316, the user database 1308 retrieves the user information, and at operation 1318 it returns the user information to the application server 1306. At operation 1320, the application server 1306 returns host and guest status to the user interface 1304. At operation 1322, the user interface 1304 displays the host and guest status.

At operation 1324, the user interface 1304 requests a guest forum list from the application server 1306. At operation 1326, the application server 1306 requests the guest forum list from the user database 1308, which retrieves it at operation 1328. At operation 1330, the user database 1308 returns the guest forum list to the application server 1306, which at operation 1332 returns it to the user interface 1304. At operation 1334, the user interface 1304 displays the guest list forum.

At operation 1336, the user interface 1304 requests a host forum list (if the user 1302 is a host). At operation 1338, the application server 1306 requests the host forum list from the user database 1308, which at operation 1340 retrieves it and then at operation 1342 returns it to the application server 1306. At operation 1344, the application server 1306 returns the host forum list to the user interface 1304, which displays it at operation 1346. At operation 1348, if the user 1302 is not a host, then an upgrade panel may be presented where a user can upgrade the user interface 1304 (possibly for a fee) to become a host.

Figure 14:
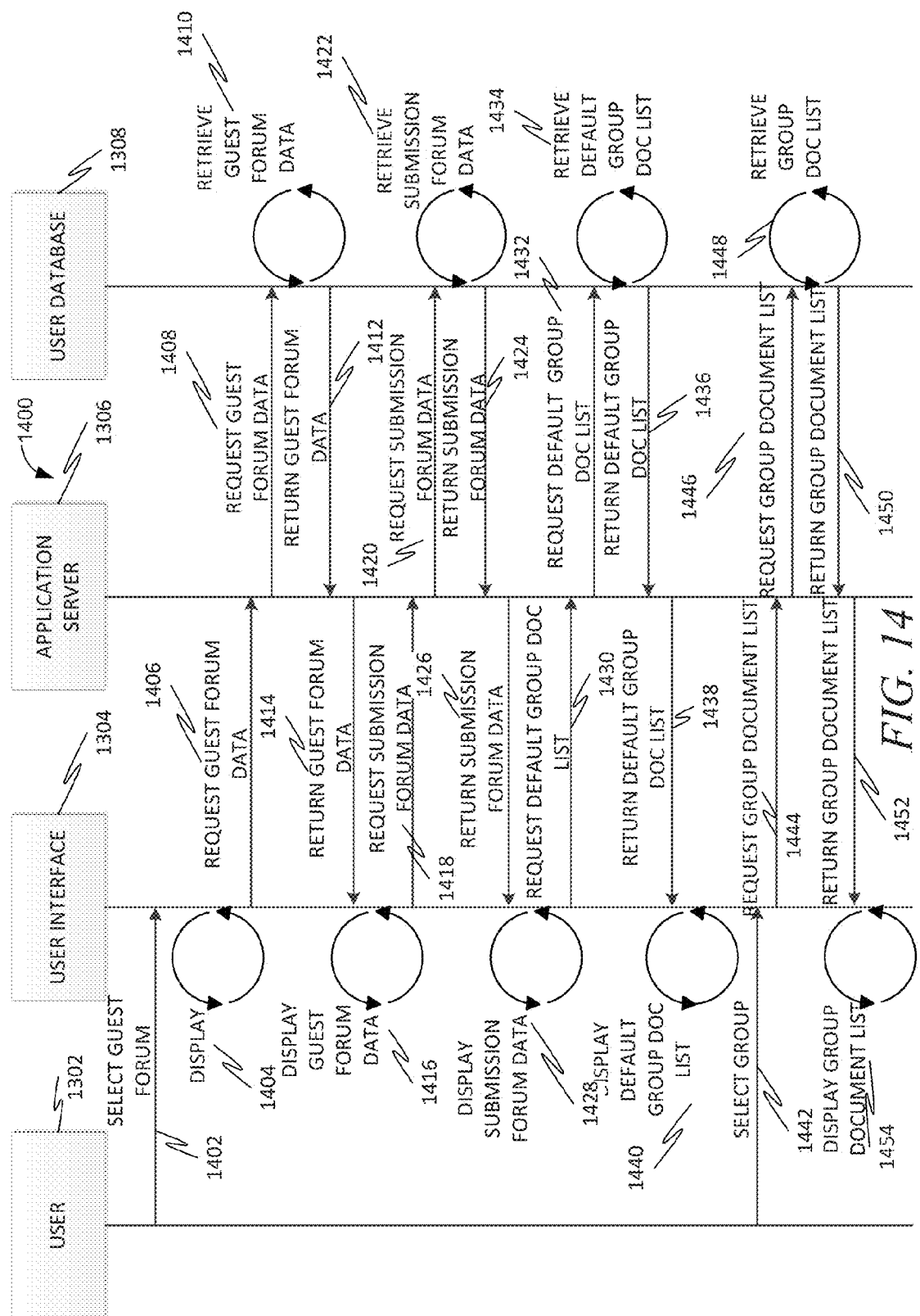
FIG. 14 is an interaction diagram illustrating a method, in accordance with an example embodiment, of presenting a guest forum page.

FIG. 14 is an interaction diagram illustrating a method 1400, in accordance with an example embodiment, of presenting a guest forum page. At operation 1402, the user 1302 selects a guest forum. This may be selected from, for example, the home page. At operation 1404, the user interface 1304 displays elements of a guest forum page. This may include elements constituting a "skeleton" of the page, meaning elements that provide the structure of the page without any of the actual data from the user database 1308. At operation 1406, the user interface 1304 requests guest forum data from the application server 1306. At operation 1408, the application server 1306 requests guest forum data from the user database 1308. At operation 1410, the guest forum data is retrieved from the user database 1308, and returned at operation 1412. At operation 1414, the guest forum data is returned to the user interface 1304 from the application server 1306. At 1416, the guest forum data is displayed by the user interface 1304.

At operation 1418, submission forum data is requested by the user interface 1304. At operation 1420, submission forum data is requested by the application server 1306. At operation 1422, the user database 1308 retrieves the submission forum data and returns it at operation 1424. At operation 1426, the submission forum data is returned to the user interface 1304. At operation 1428, the submission forum data is displayed by the user interface 1304.

At operation 1430, the user interface 1304 requests a default group document list. At operation 1432, the application server 1306 requests the default group document list from the user database 1308. At operation 1434, the default group document list is retrieved by the user database 1308 and returned at operation 1436. At operation 1438, the default group document list is returned to the user interface 1304. At operation 1440, the user interface 1304 displays the default group document list.

At operation 1442, the user 1302 selects a group. At operation 1444, the user interface 1304 requests a group document list for the selected group from the application server 1306, which at operation 1446 requests it from the user database 1308. At operation 1448, the group document list is retrieved from the user database 1308, and it is returned to the application server 1306 at operation 1450. At operation 1452, the group document list is returned to the user interface 1304, which displays it at operation 1454.

Figure 15:
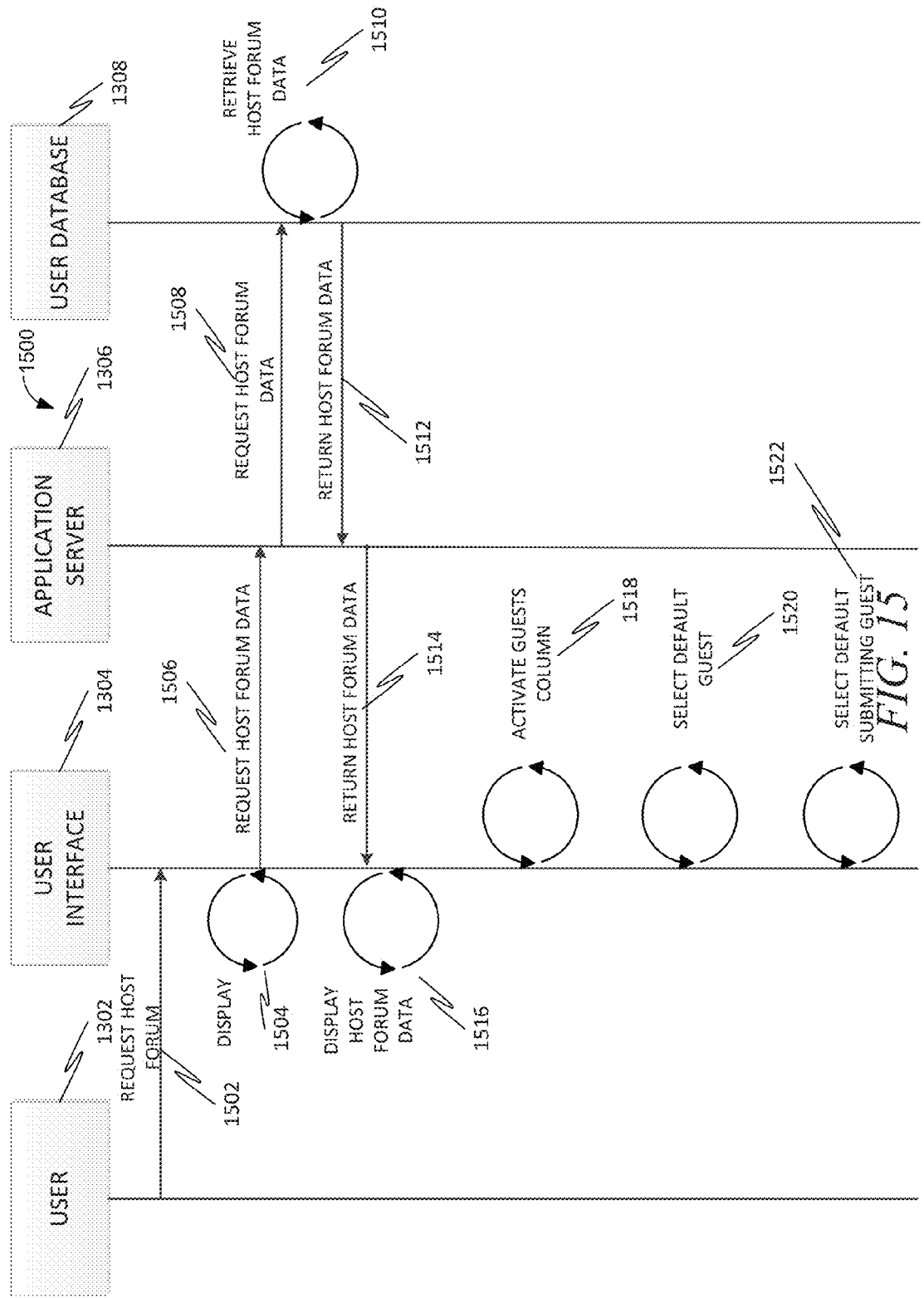
FIG. 15 is an interaction diagram illustrating a method, in accordance with an example embodiment, of presenting a host forum page.

FIG. 15 is an interaction diagram illustrating a method 1500, in accordance with an example embodiment, of presenting a host forum page. At operation 1502, the user 1302 requests a host forum. This may be requested from, for example, the home page. At operation 1504, the user interface 1304 may display elements of a host forum page. This may include elements constituting a skeleton of the page. At operation 1506, the user interface 1304 may request host forum data from the application server 1306. At operation 1508, the application server 1306 requests the host forum data from the user database 1308. At operation 1510, the user database 1308 retrieves the host forum data and returns it to the application server 1306 at operation 1512. At operation 1514, the application server 1306 returns the host forum data to the user interface 1304, which displays it at operation 1516. At operation 1518, the user interface 1304 may activate a guests column. At operation 1520, the user interface 1304 may select a default guest and select a default submitting guest at operation 1522.

Figure 16:
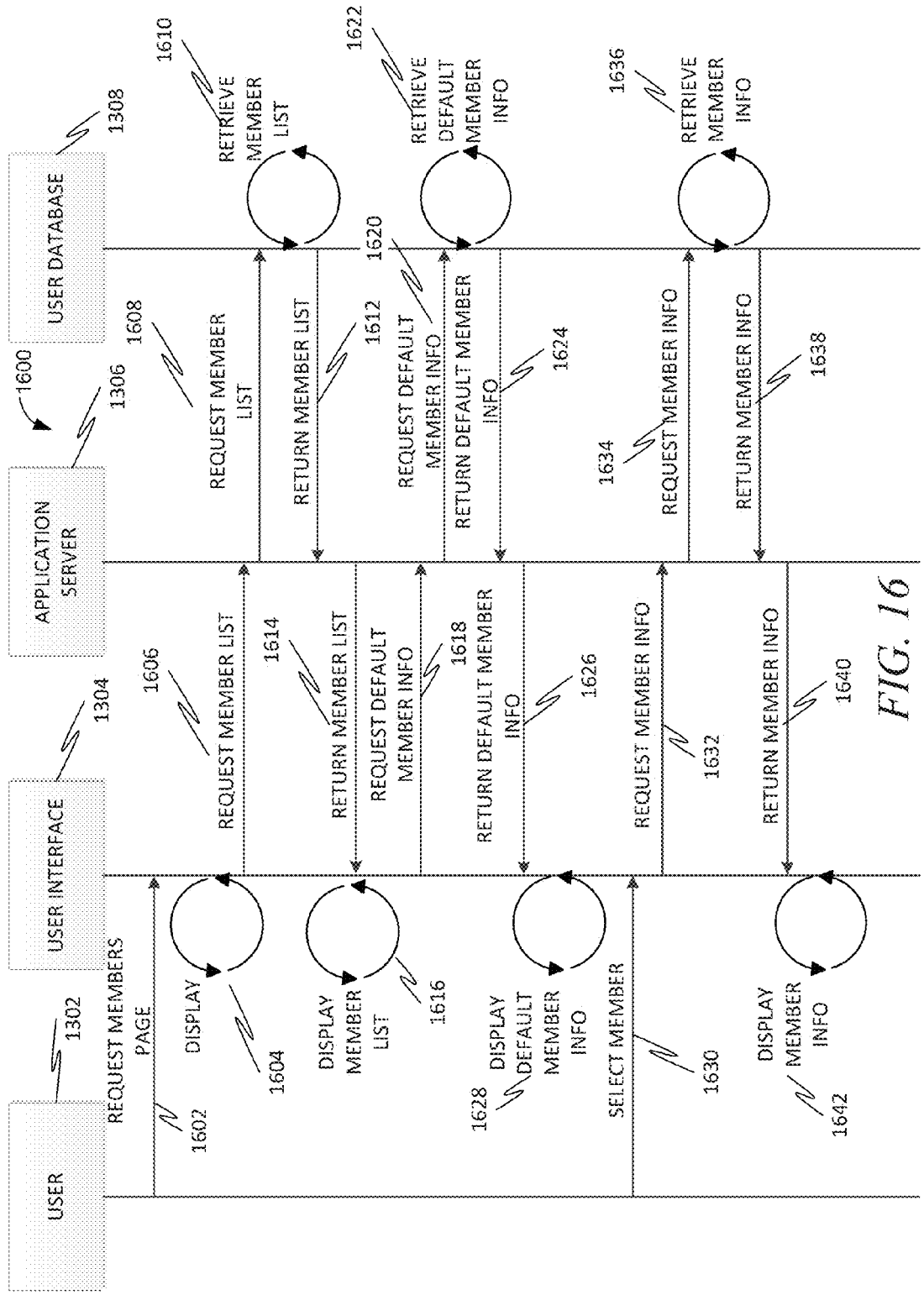
FIG. 16 is an interaction diagram illustrating a method, in accordance with an example embodiment, of presenting a members page.

FIG. 16 is an interaction diagram illustrating a method 1600, in accordance with an example embodiment, of presenting a members page. At operation 1602, a user 1302 may request a members page. This may be requested from, for example, the home page. At operation 1604, the user interface 1304 may display elements of a members page. This may include elements constituting a skeleton of the page. At operation 1606, the user interface 1304 may request a member list from the application server 1306, which may request it from the user database 1308 at operation 1608. At operation 1610, the user database 1308 may retrieve the member list and return it at operation 1612. At operation 1614, the application server 1306 may return the member list to the user interface 1304, which may display it at operation 1616.

At operation 1618, the user interface 1304 may request default member information from the application server 1306, which may request it from the user database 1308 at operation 1620. At operation 1622, the user database 1308 may retrieve the default member information and return it at operation 1624. At operation 1626, the application server 1306 may return the default member information to the user interface 1304, which may display it at operation 1628.

At operation 1630, the user 1302 may select a member. At operation 1632, the user interface 1304 may request member information for the selected member from the application server 1306, which at operation 1634 may request it from the user database 1308. At operation 1636, the user database 1308 may retrieve the member information and return it to the application server 1306 at operation 1638. At operation 1640, the application server 1306 may return the member information to the user interface 1304, which may display it at operation 1642.

Figure 17:
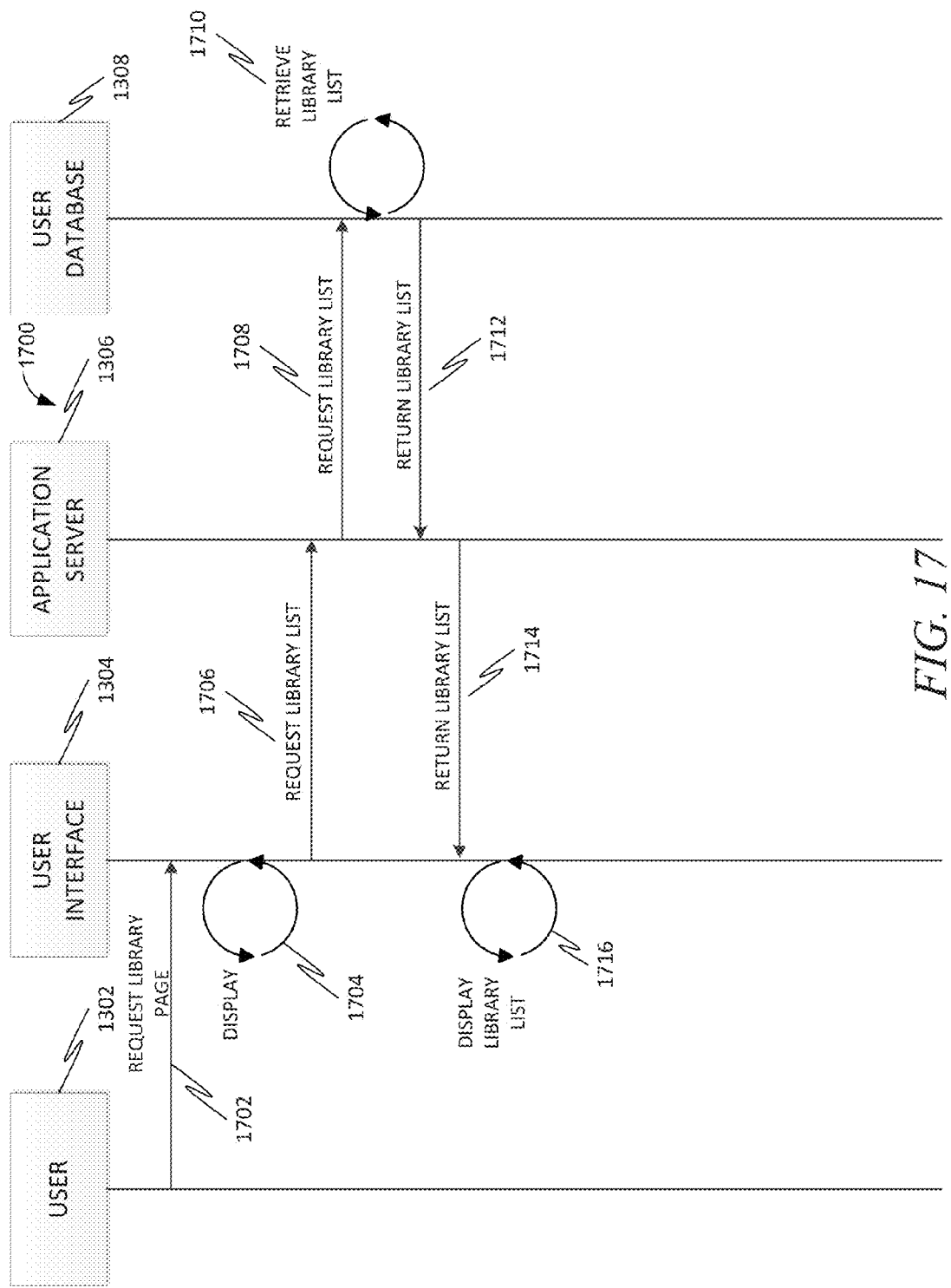
FIG. 17 is an interaction diagram illustrating a method, in accordance with an example embodiment, of presenting a library page.

FIG. 17 is an interaction diagram illustrating a method 1700, in accordance with an example embodiment, of presenting a library page. At operation 1702, a user 1302 may request a library page. This may be requested from, for example, the home page. At operation 1704, the user interface 1304 may display elements of a library page. This may include elements constituting a skeleton of the page. At operation 1706, the user interface 1304 may request a library list from the application server 1306, which may request it from the user database 1308 at operation 1708. At operation 1710, the user database 1308 may retrieve the library list and return it to the application server 1306 at operation 1712. At operation 1714, the application server 1306 may return the library list to the user interface 1304, which may display it at operation 1716.

Figure 18:
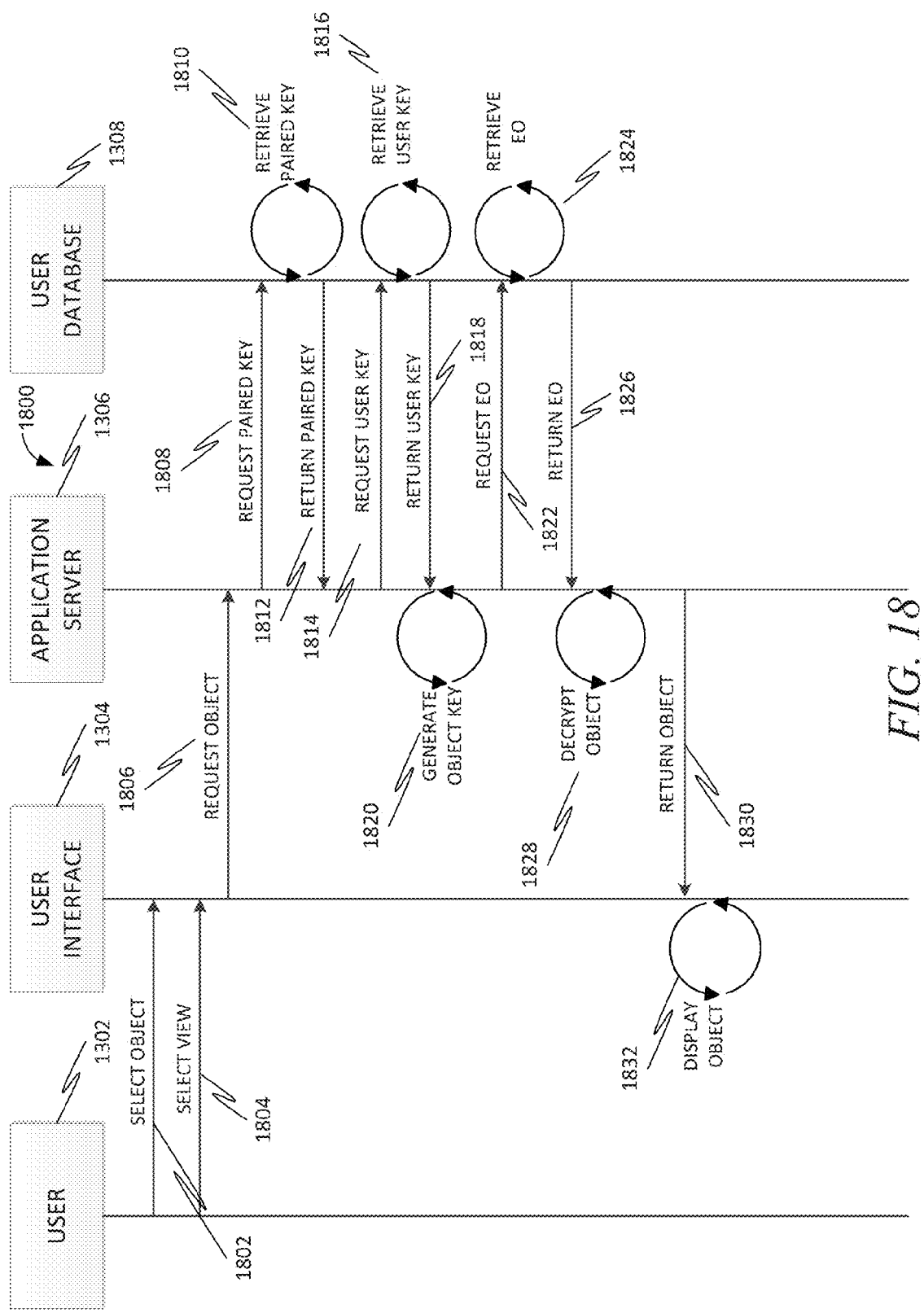
FIG. 18 is an interaction diagram illustrating a method, in accordance with an example embodiment, of presenting a view of an encrypted object.

FIG. 18 is an interaction diagram illustrating a method 1800, in accordance with an example embodiment, of presenting a view of an encrypted object. At operation 1802, a user 1302 may select an object and at operation 1804, the user 1302 may select to view the object. At operation 1806, the user interface 1304 may request the object from the application server 1306. At operation 1808, the application server 1306 may request a paired key from the user database 1308. At operation 1810, the user database 1308 may retrieve the paired key and return it to the application server 1306 at operation 1812. At operation 1814, the application server 1306 may retrieve a user key from the user database 1308. At operation 1816, the user database 1308 may retrieve the user key and return the user key to the application server 1306 at operation 1818.

At operation 1820, the application server 1306 may generate an object key using the paired key and the user key. At operation 1822, the application server 1306 may request the encrypted object from the user database 1308. At operation 1824, the user database 1308 may retrieve the encrypted object and return it to the application server 1306 at operation 1826. At operation 1828, the application server 1306 may decrypt the object using the object key, and at 1830 return it to the user interface 1304. At operation 1832, the object may be displayed.

Figure 19:
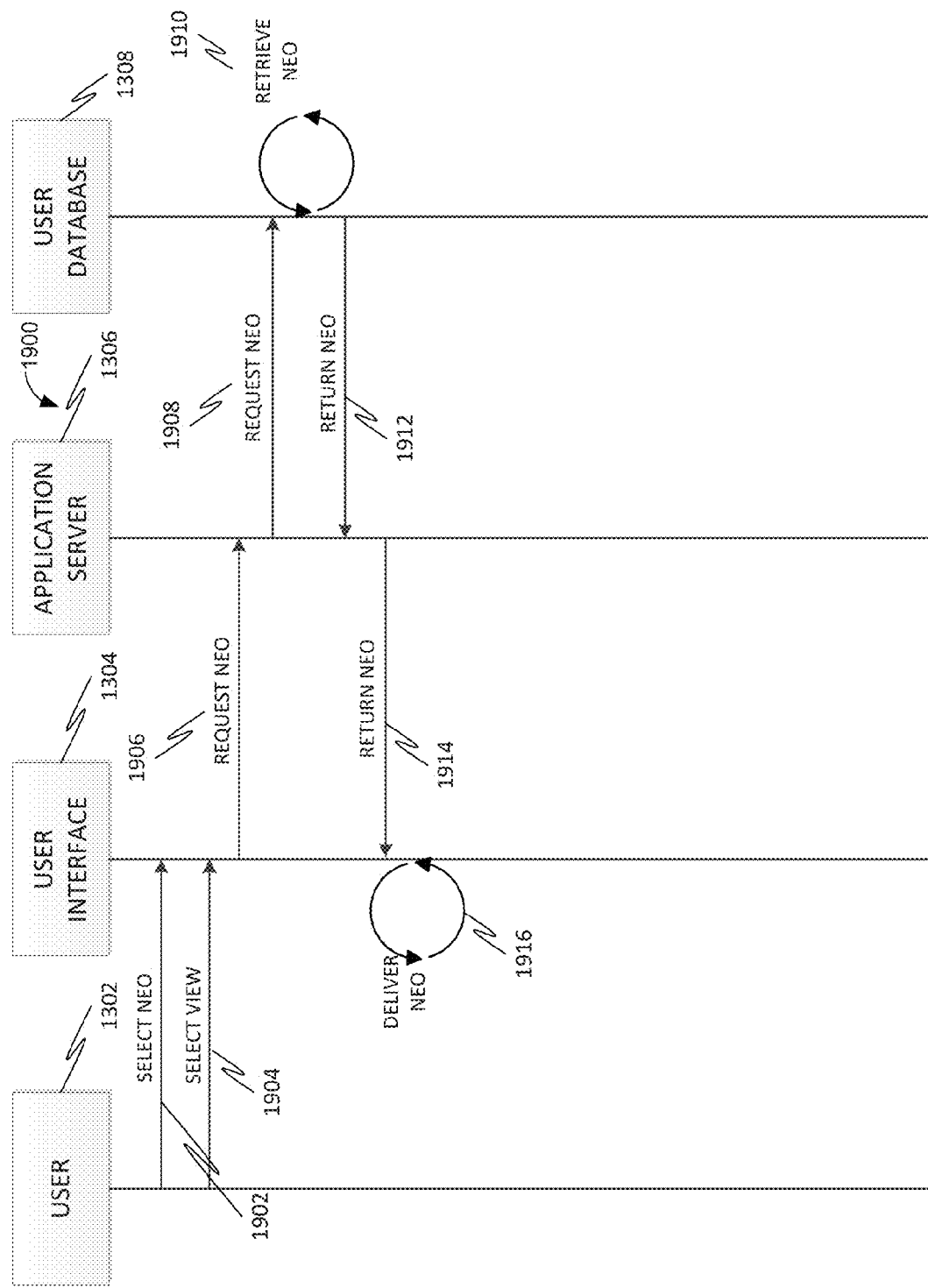
FIG. 19 is an interaction diagram illustrating a method, in accordance with an example embodiment, of presenting a view of a non-encrypted object.

FIG. 19 is an interaction diagram illustrating a method 1900, in accordance with an example embodiment, of presenting a view of a non-encrypted object. At operation 1902, a user 1302 may select an object and at operation 1904, the user 1302 may select to view the object. At operation 1906, the user interface 1304 may request the object from the application server 1306. At operation 1908, the application server 1306 may request the non-encrypted object from the user database 1308. At operation 1910, the user database 1308 may retrieve the non-encrypted object and return it to the application server 1306 at operation 1912. At operation 1914, the application server 1306 may return it to the user interface 1302. At operation 1916, the object may be displayed.

Figure 20:
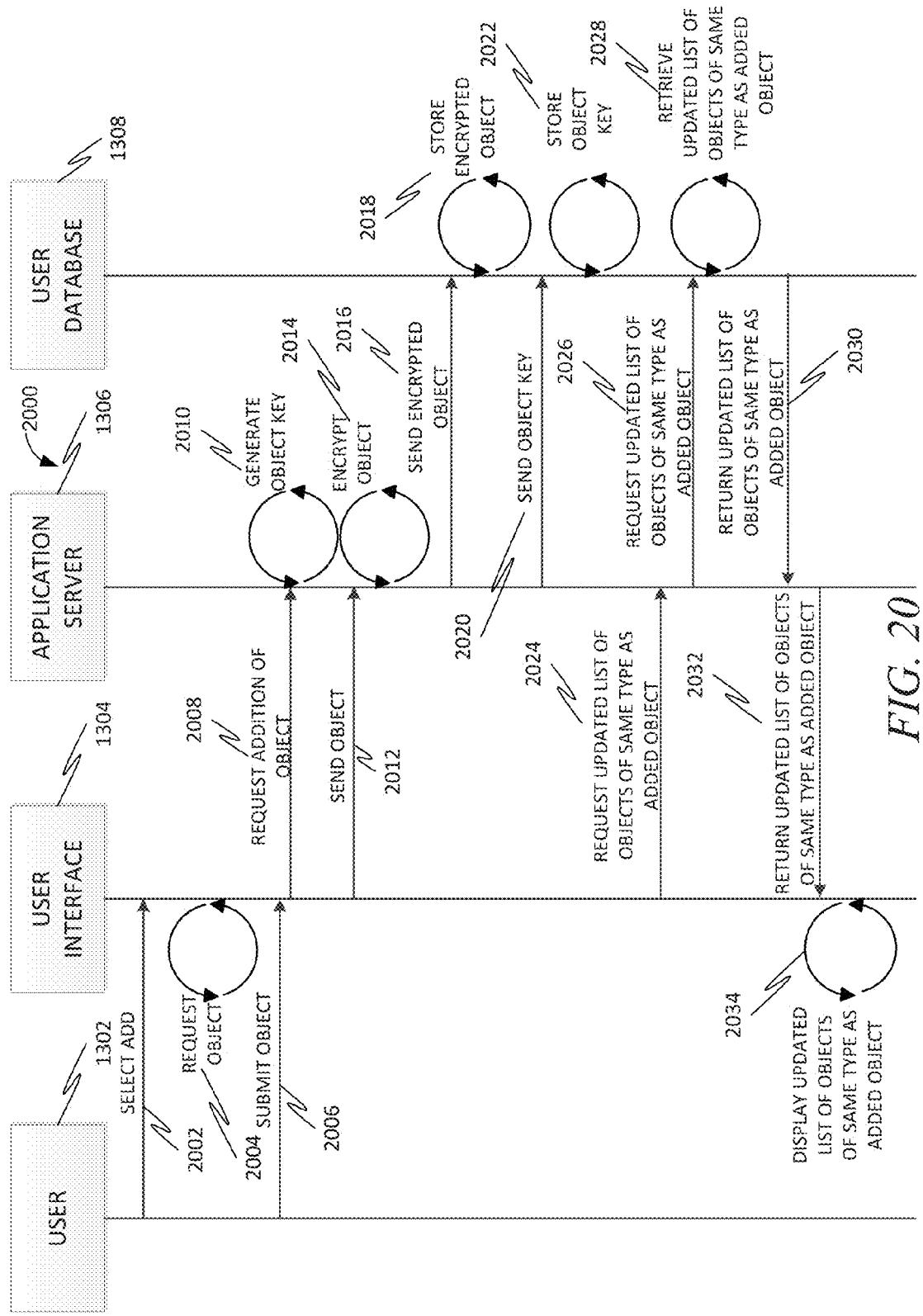
FIG. 20 is an interaction diagram illustrating a method, in accordance with an example embodiment, of adding an encrypted object.

FIG. 20 is an interaction diagram illustrating a method 2000, in accordance with an example embodiment, of adding an encrypted object. At operation 2002, a user 1302 may select an add operation. At operation 2004, the user interface 1304 may request an object. At operation 2006, the user 1302 may submit the object to the user interface 1304. At operation 2008, the user interface 1304 may request addition of the object. At operation 2010, the application server 1306 may generate an object key for the object. At operation 2012, the user interface 1304 may send the object to the application server 1306. At operation 2014, the application server 1306 may encrypt the object. At operation 2016, the application server 1306 may send the encrypted object to the user database 1308, which may store it at operation 2018.

At operation 2020, the application server 1306 may send an object key to the user database 1308, which may store it at operation 2022. At operation 2024, the user interface 1304 may request the an updated list of objects of the same type as the added object from the application server 1306, which may request it from the user database 1308 at operation 2026. For example, if a guest is being added, the system may request an updated list of guests from the application server 1306 to ensure that the list presented is updated with any other system-wide changes. At operation 2028, the user database 1308 may retrieve the updated list of objects of the same type as the added object and return it at operation 2030. At operation 2032, the application server 1306 may return the updated list of objects of the same type as the added object to the user interface 1304, which may display it at operation 2034.

Figure 21:
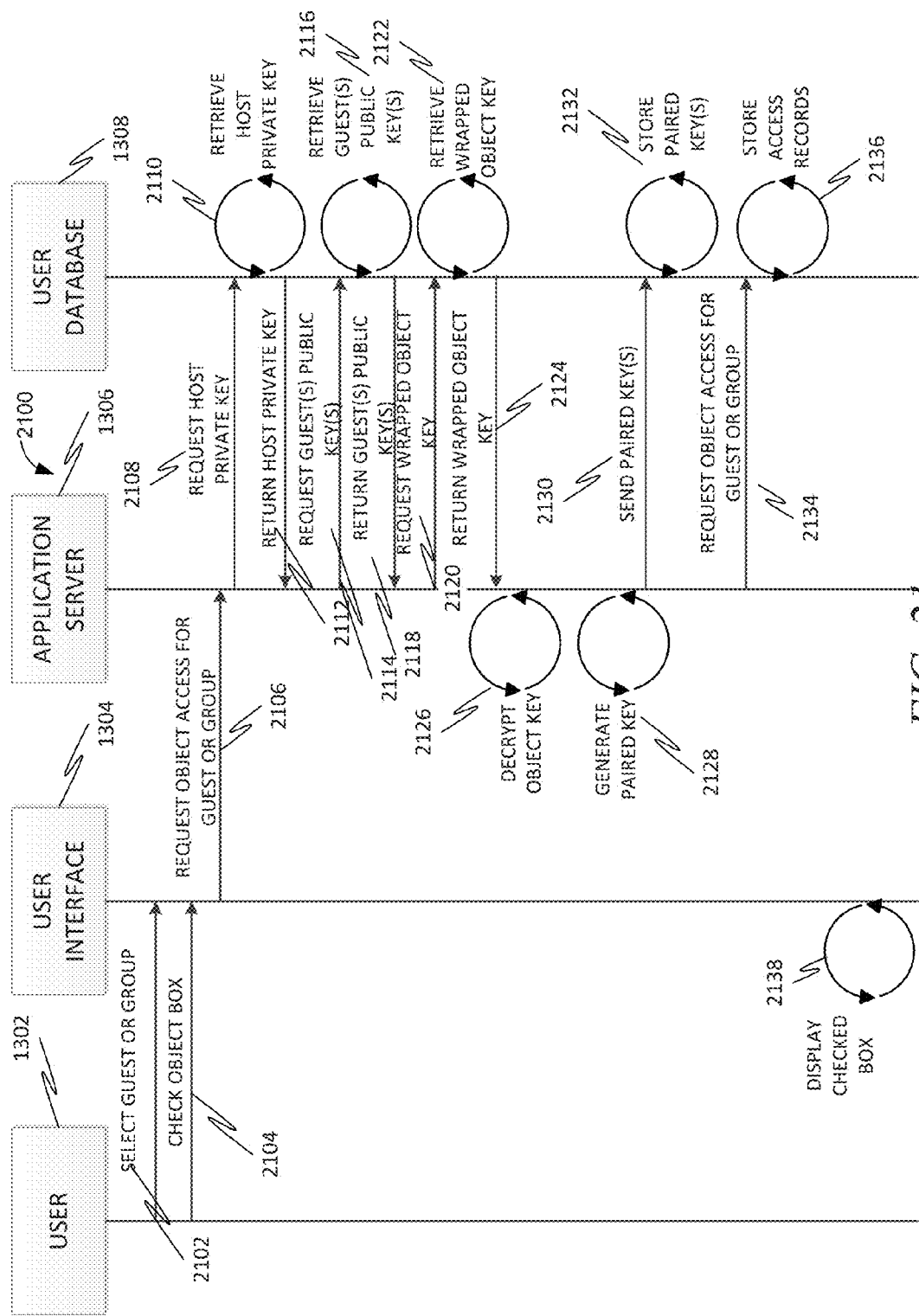
FIG. 21 is an interaction diagram illustrating a method, in accordance with an example embodiment, of granting access to an encrypted object.

FIG. 21 is an interaction diagram illustrating a method 2100, in accordance with an example embodiment, of granting access to an encrypted object. At operation 2102, a user 1302 may select a guest or group. At operation 2104, the user 1302 may check an object box for an object associated with the guest or group to which the user 1302 wishes to grant access. At operation 2106, the user interface 1304 requests object access for the guest or group. At operation 2108, the application server 1306 requests a host private key from the user database 1308. At operation 2110, the user database 1308 retrieves the host private key and returns it at operation 2112. At operation 2114, the application server 1306 requests the guest(s)' public key(s) from the user database 1308. At operation 2116, the user database 1308 retrieves the guest(s)' public key(s) and returns them at operation 2118.

At operation 2120, the application server 1306 requests a wrapped object key from the user database 1308. At operation 2122, the user database 1308 retrieves the wrapped object key and returns it at operation 2124. At operation 2126, the application server 1306 decrypts the object key and generates a paired key(s) at operation 2128. At operation 2130, the application server 1306 sends the paired key(s) to the user database 1308, which stores it at operation 2132. At operation 2134, the application server 1306 requests object access for the guest or group. At operation 2136, the user database stores the access records associated with the guest or group, thus permitting access. At operation 2138, the user interface 1304 displays a checked box indicating that the access has been permitted.

Figure 22:
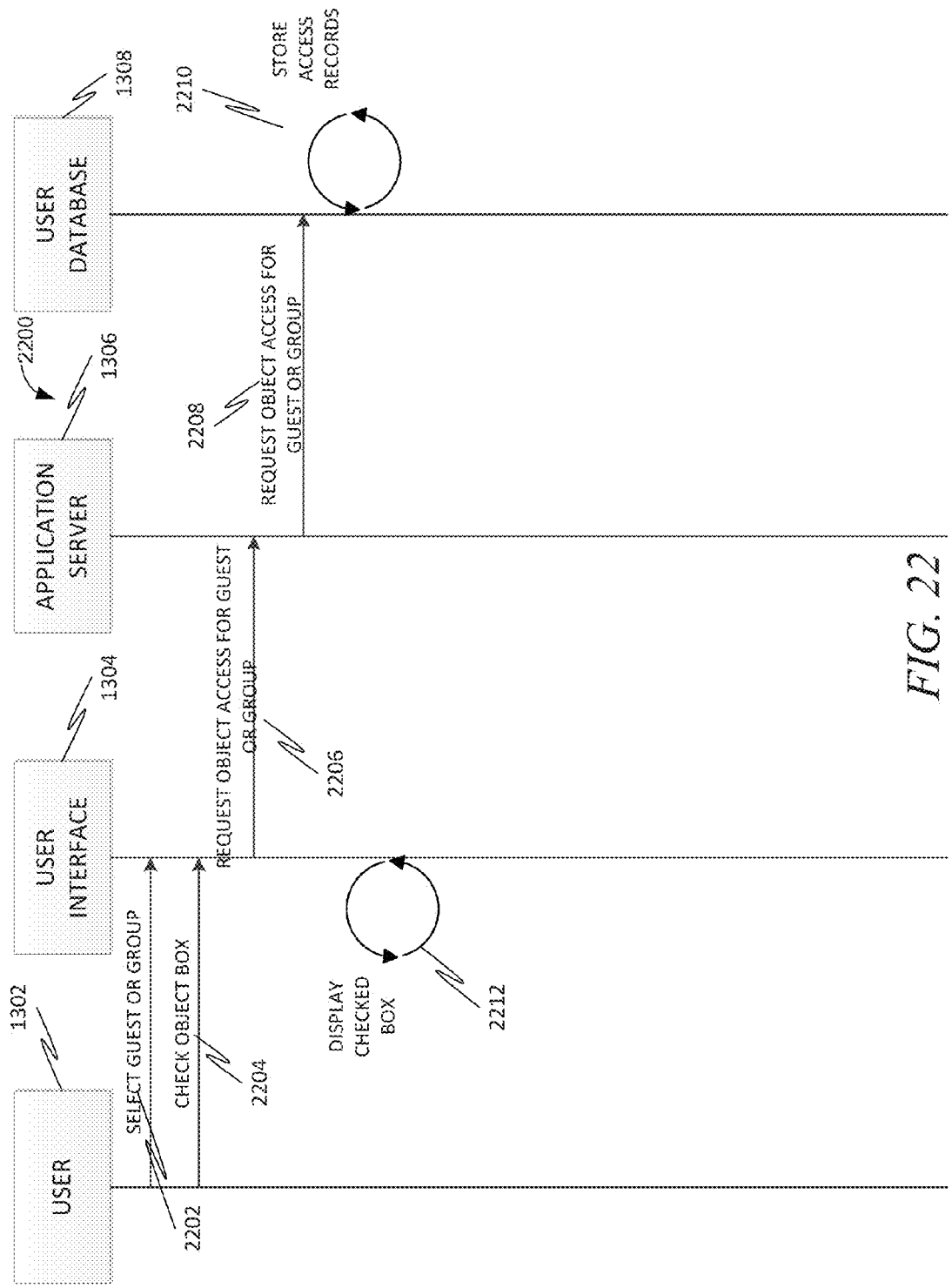
FIG. 22 is an interaction diagram illustrating a method, in accordance with an example embodiment, of granting access to a non-encrypted object.

FIG. 22 is an interaction diagram illustrating a method 2200, in accordance with an example embodiment, of granting access to a non-encrypted object. At operation 2202, a user 1302 may select a guest or group. At operation 2204, the user 1302 may check an object box for an object associated with the guest or group to which the user 1302 wishes to grant access. At operation 2206, the user interface 1304 requests object access for the guest or group, which is then passed to the user database 1308 at operation 2208. At operation 2210 the user database 1308 stores the access records associated with the guest or group, thus permitting access. At operation 2212, the user interface 1304 displays a checked box, indicating that the access has been permitted.

Figure 23:
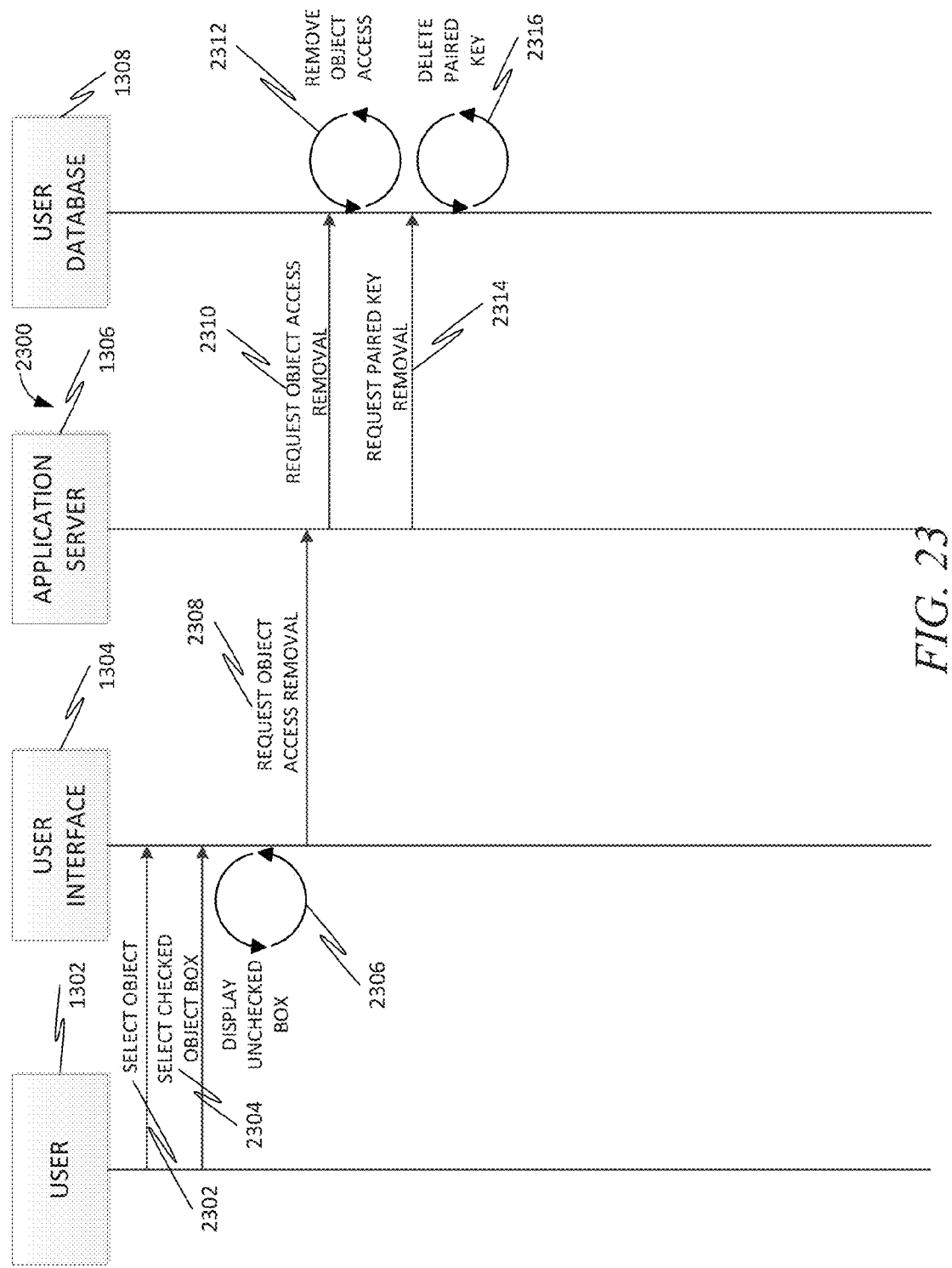
FIG. 23 is an interaction diagram illustrating a method, in accordance with an example embodiment, of removing access to an encrypted object.

FIG. 23 is an interaction diagram illustrating a method 2300, in accordance with an example embodiment, of removing access to an encrypted object. At operation 2302, a user 1302 may select a guest or group. At operation 2304, the user 1302 may select a checked object box for an object associated with the guest or group to which the user 1302 wishes to remove access. At operation 2306, the user interface 1304 displays an unchecked box. At operation 2308, the user interface 1304 requests object access removal for the selected object. At operation 2310, the application server 1306 sends this request to the user database 1308, which removes object access at operation 2312. At operation 2314, the application server 1306 requests paired key removal. At operation 2316, the user database 1308 deletes the paired key.

Figure 24:
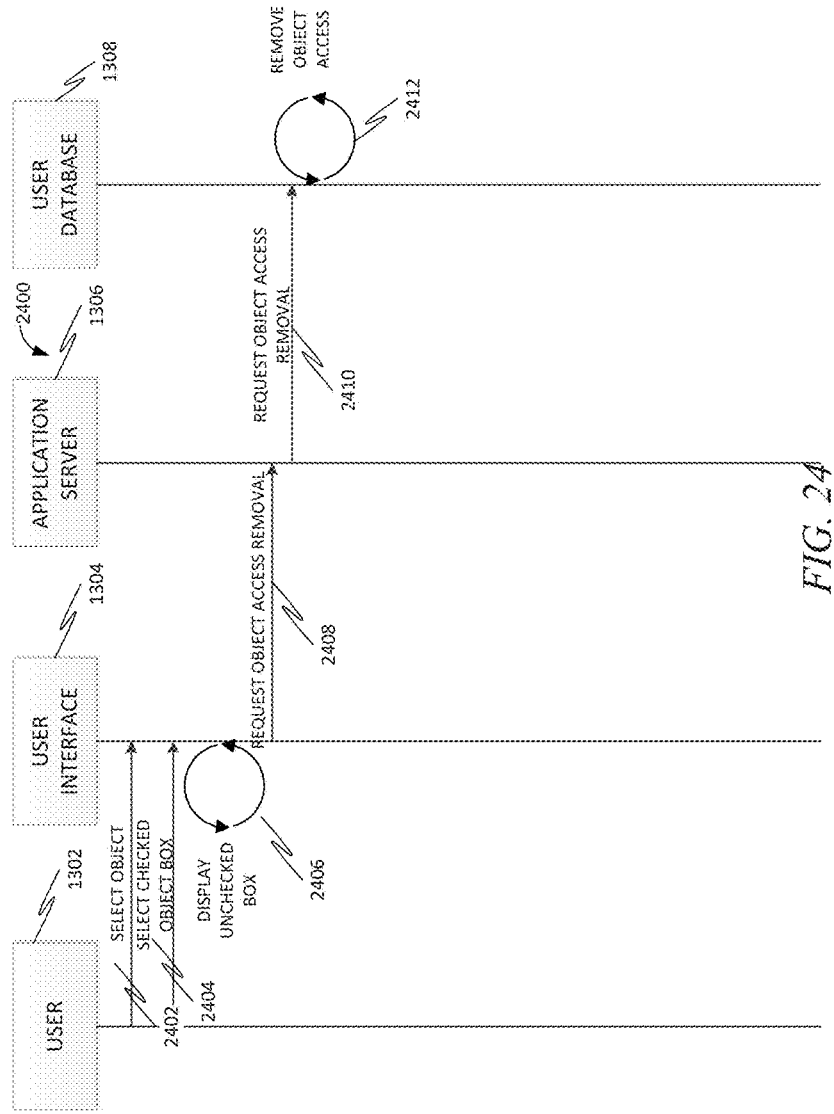
FIG. 24 is an interaction diagram illustrating a method, in accordance with an example embodiment, of removing access to a non-encrypted object.

FIG. 24 is an interaction diagram illustrating a method 2400, in accordance with an example embodiment, of removing access to a non-encrypted object. At operation 2402, a user 1302 may select a guest or group. At operation 2404, the user 1302 may select a checked object box for an object associated with the guest or group to which the user 1302 wishes to remove access. At operation 2406, the user interface 1304 displays an unchecked box. At operation 2408, the user interface 1304 requests object access removal for the selected object. At operation 2410, the application server 1306 sends this request to the user database 1308, which removes object access at operation 2412.

Figure 25:
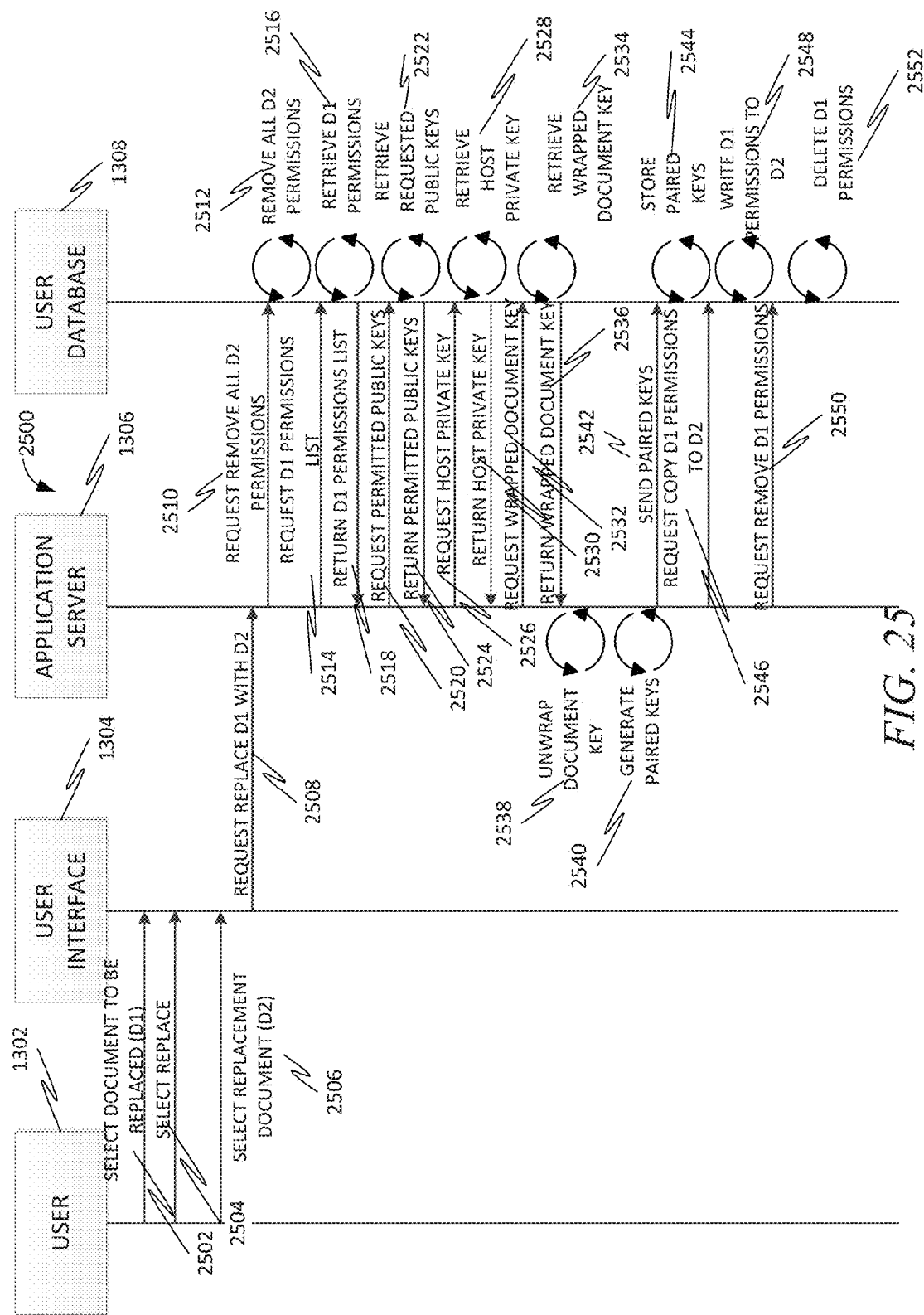
FIG. 25 is an interaction diagram illustrating a method, in accordance with an example embodiment, of replacing an object.

FIG. 25 is an interaction diagram illustrating a method 2500, in accordance with an example embodiment, of replacing an object. At operation 2502, a user 1302 may select a document to be replaced. This document may be known as D1. At operation 2504, the user 1302 may select a replace operation, at which point he may be prompted to select a replacement document. At operation 2506, the user 1302 may select a replacement document, identified herein as D2. At operation 2508, the user interface 1304 may send a request to the application server 1306 to replace D1 with D2. At operation 2510, the application server 1306 sends a request to remove all D2 permissions to the user database 1308, which at operation 2512 removes all permissions for D2.

At operation 2514, the application server 1306 requests a permissions list for D1. At operation 2516, the user database 1308 retrieves the permissions list for D1 and returns it at operation 2518. At operation 2520, the application server 1306 requests pubic keys of the permitted guests. At operation 2522, the user database 1308 retrieves the requested public keys of the permitted guests and returns them at operation 2524. At operation 2526, the application server 1306 requests the host private key. At operation 2528, the user database 1308 retrieves the host private key and returns it at operation 2530.

At operation 2532, the application server 1306 requests a wrapped document key. At operation 2534, the user database 1308 retrieves the wrapped document key and returns it at operation 2536. At operation 2538, the application server unwraps the document key and generates paired keys at operation 2540. At operation 2542, the application server 1306 sends the paired keys to the user database 1308. At operation 2544, the user database 1308 stores the paired keys. At operation 2546, the application server 1306 requests to copy the D1 permissions to D2, which the user database 1308 performs at operation 2548. At operation 2550, the application server 1306 requests that D1 permissions be removed, which the user database 1308 performs at operation 2552.

Figure 26:
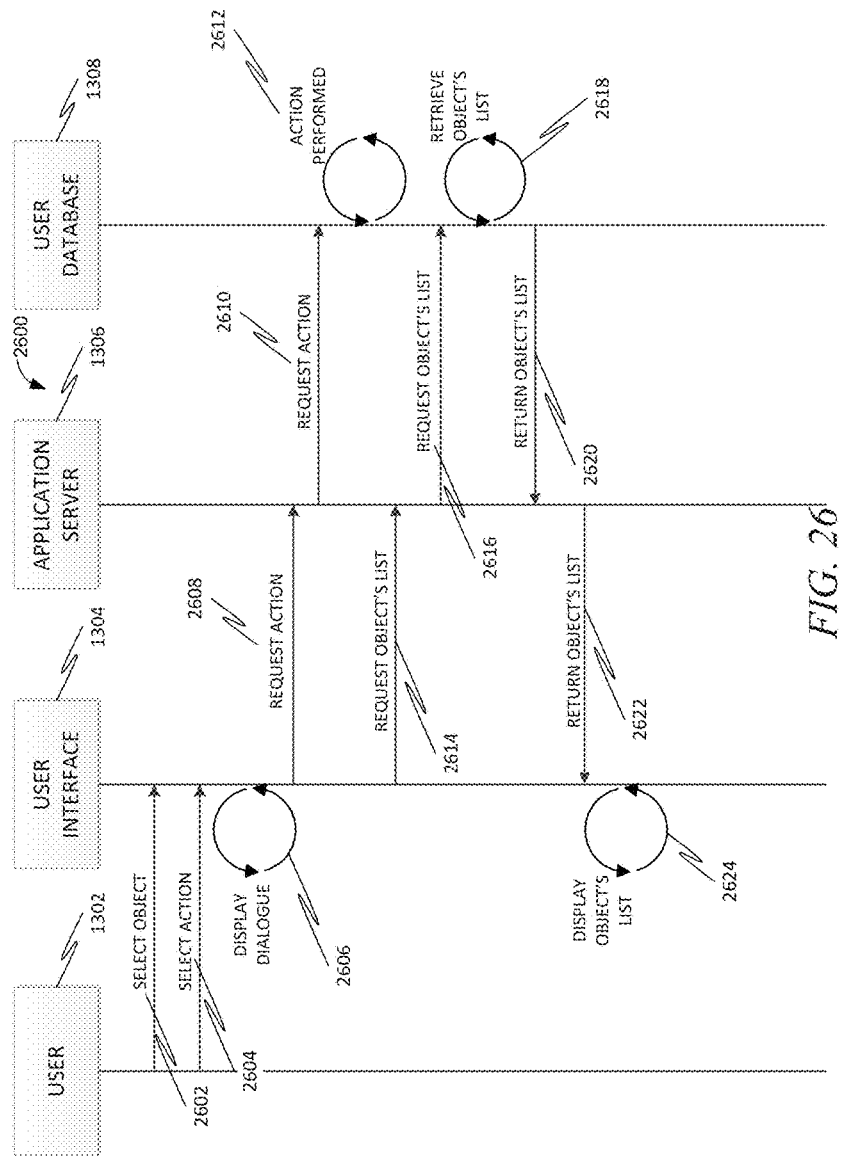
FIG. 26 is an interaction diagram illustrating a method, in accordance with an example embodiment, of removing or renaming an object.

FIG. 26 is an interaction diagram illustrating a method 2600, in accordance with an example embodiment, of removing or renaming an object. At operation 2602, the user 1302 may select an object and at operation 2604, the user may select an action, such as removing or renaming, to be performed on the object. At operation 2606, a dialog may be displayed. The dialog is for a rename function, and the dialog requests a new name of the object from the user. At operation 2608, the user interface 1304 may request that the selected action be performed. At operation 2610, the application server 1306 may pass this request to the user database 1308. At operation 2612, the user database 1308 may perform the action. At operation 2614, the user interface 1304 may request the object's list. This is the list of objects of a specific type in the host forum (or guest submission area of a guest forum). Operations 2614-2614 update the relevant column of the Host Forum after a remove or rename operation has occurred. At operation 2616, the application server 1306 may pass this request to the user database 1308. At operation 2618, the user database 1308 may retrieve the object's list and return it at operation 2620. The object's list is then returned to the user interface 1304 at operation 2622, where it is displayed at operation 2624.

Figure 27:
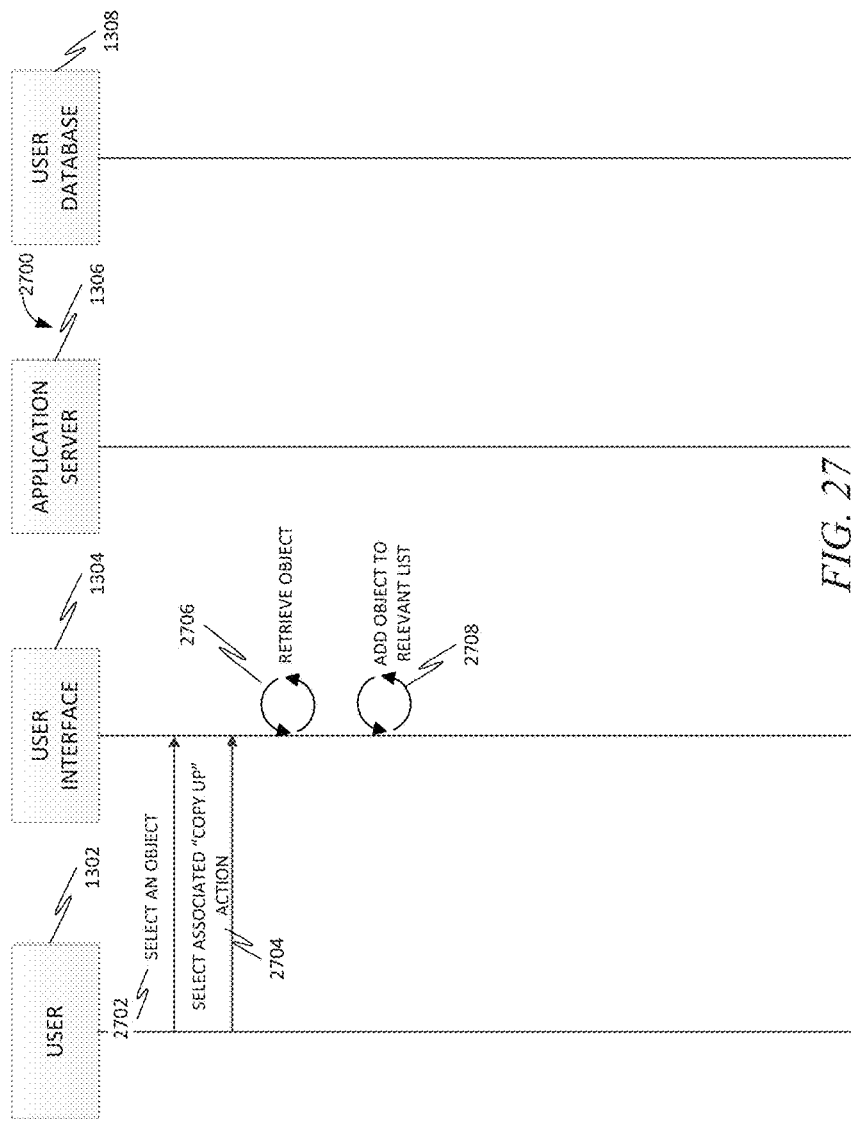
FIG. 27 is an interaction diagram illustrating a method, in accordance with an example embodiment, of copying up an object.

FIG. 27 is an interaction diagram illustrating a method 2700, in accordance with an example embodiment, of copying up an object. Copying up refers to making a copy of a guest submitted object (document, dates, or conversation) from the guest submitting area of the host forum, and placing that copy into the Host Forum area. The guest submitting area is 'below' the host forum area, so the object is copied 'up.' At operation 2702, the user 1302 may select an object and at operation 2704, select an associated "copy up" action. At operation 2706, the user interface 2706 may retrieve the object and add the object to a relevant list at operation 2708.

Figure 28:
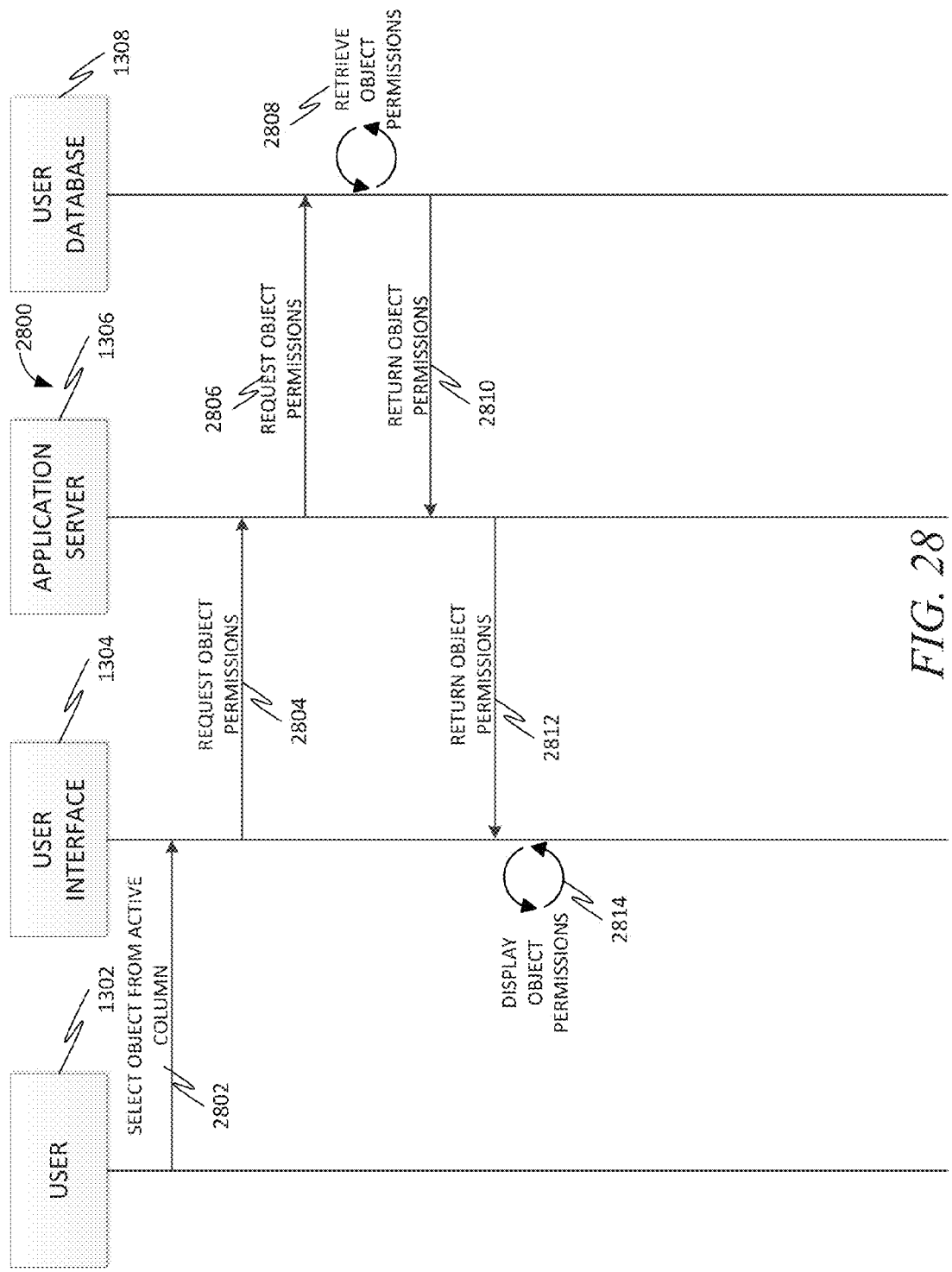
FIG. 28 is an interaction diagram illustrating a method, in accordance with an example embodiment, of selecting a host forum object.

FIG. 28 is an interaction diagram illustrating a method 2800, in accordance with an example embodiment, of selecting a host forum object. At operation 2802, the user 1302 may select an object from an active column. At operation 2804, the user interface 1304 requests object permissions for the selected object. This request may be passed to the user database 1308 from the application server 1306 at operation 2806. At operation 2808, the user database 1308 retrieves the object permissions and returns them at operation 2810. At operation 2812, the object permissions are returned to the user interface 1304, where they are displayed at operation 2814.

Figure 29:
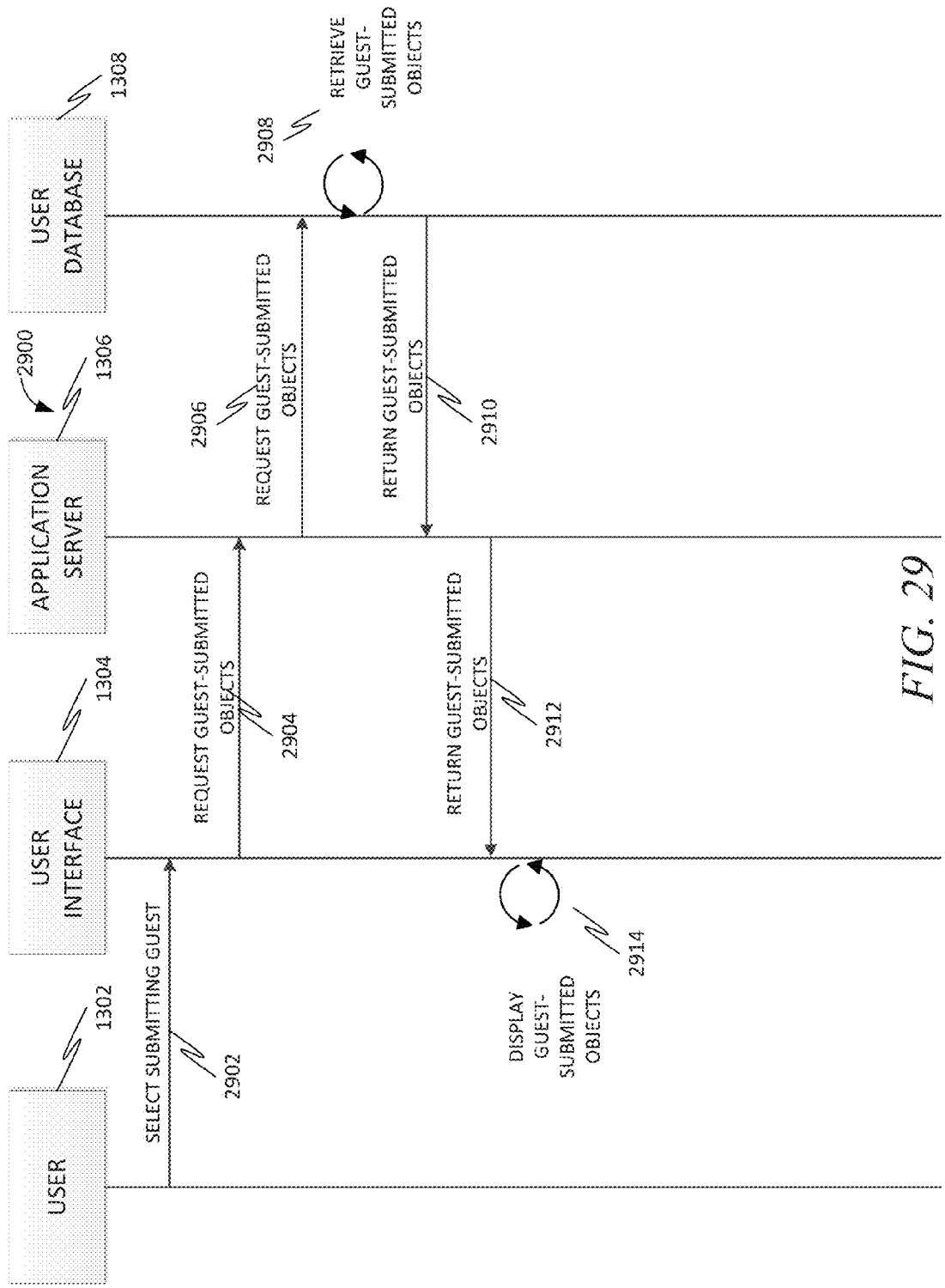
FIG. 29 is an interaction diagram illustrating a method, in accordance with an example embodiment, of selecting a submitting guest.

FIG. 29 is an interaction diagram illustrating a method 2900, in accordance with an example embodiment, of selecting a submitting guest. A submitting guest is a forum guest who submits an object to the host of a forum. The submitting guest uses the guest submitting area of the guest forum to do this. At operation 2902, the user 1302 may select a submitting guest. At operation 2904, the user interface 1304 requests guest-submitted objects for the submitting guest. At operation 2906, this request is passed to the user database 1308. At operation 2908, the user database 1308 retrieves the guest-submitted objects and returns them at operation 2910. At operation 2912, the guest-submitted objects are returned to the user interface 1304, where they are displayed at operation 2914.

Figure 30:
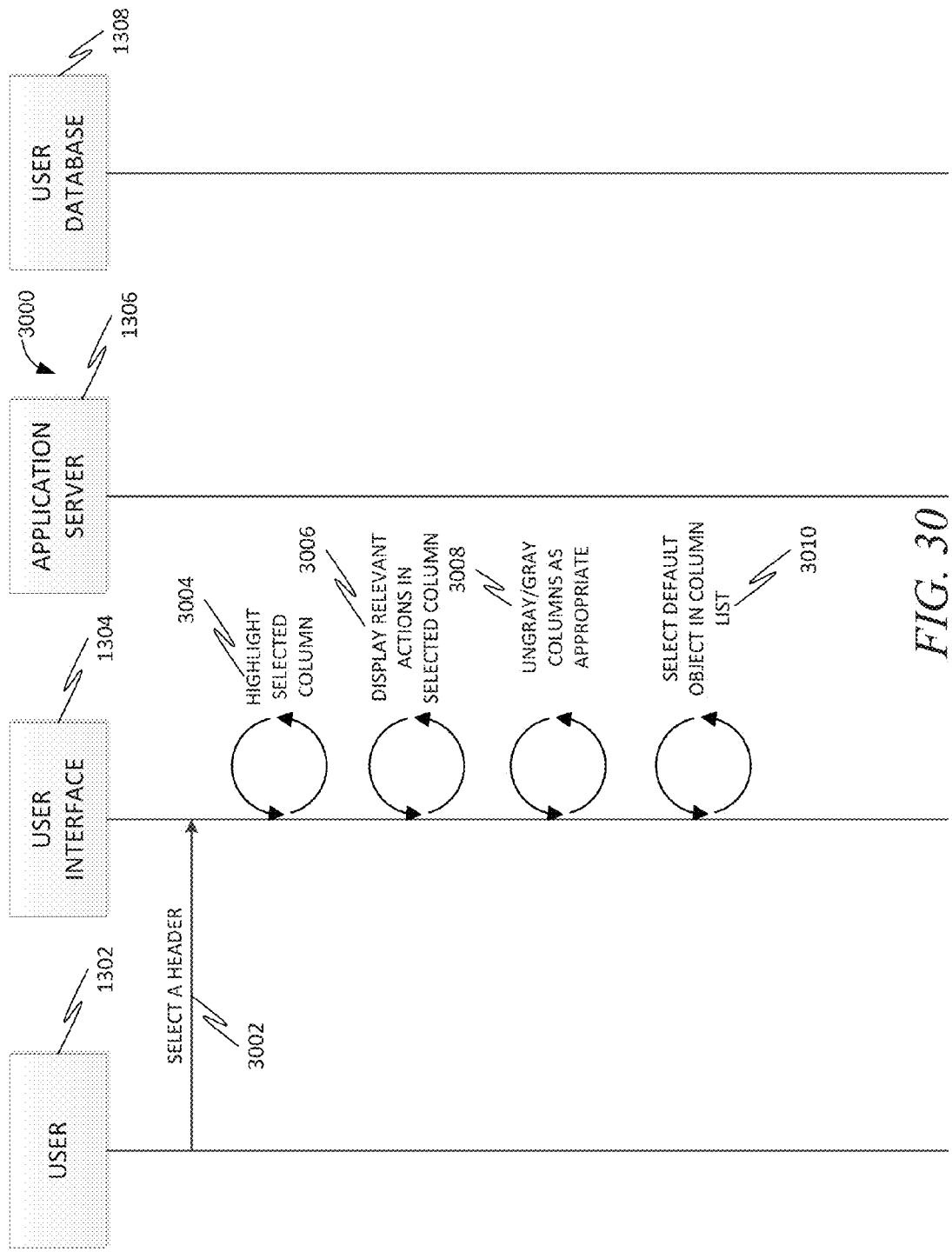
FIG. 30 is an interaction diagram illustrating a method, in accordance with an example embodiment, of activating a host column forum.

FIG. 30 is an interaction diagram illustrating a method 3000, in accordance with an example embodiment, of activating a host forum column. At operation 3002, the user 1302 may select a header. At operation 3004, the user interface 1304 may highlight the column having the selected header. At operation 3006, the user interface 1304 may display relevant actions in the selected column. At operation 3008, the user interface 1304 may gray out or un-gray the columns as appropriate. At operation 3010, the user interface 1304 may select a default object in a column list.

Figure 31:
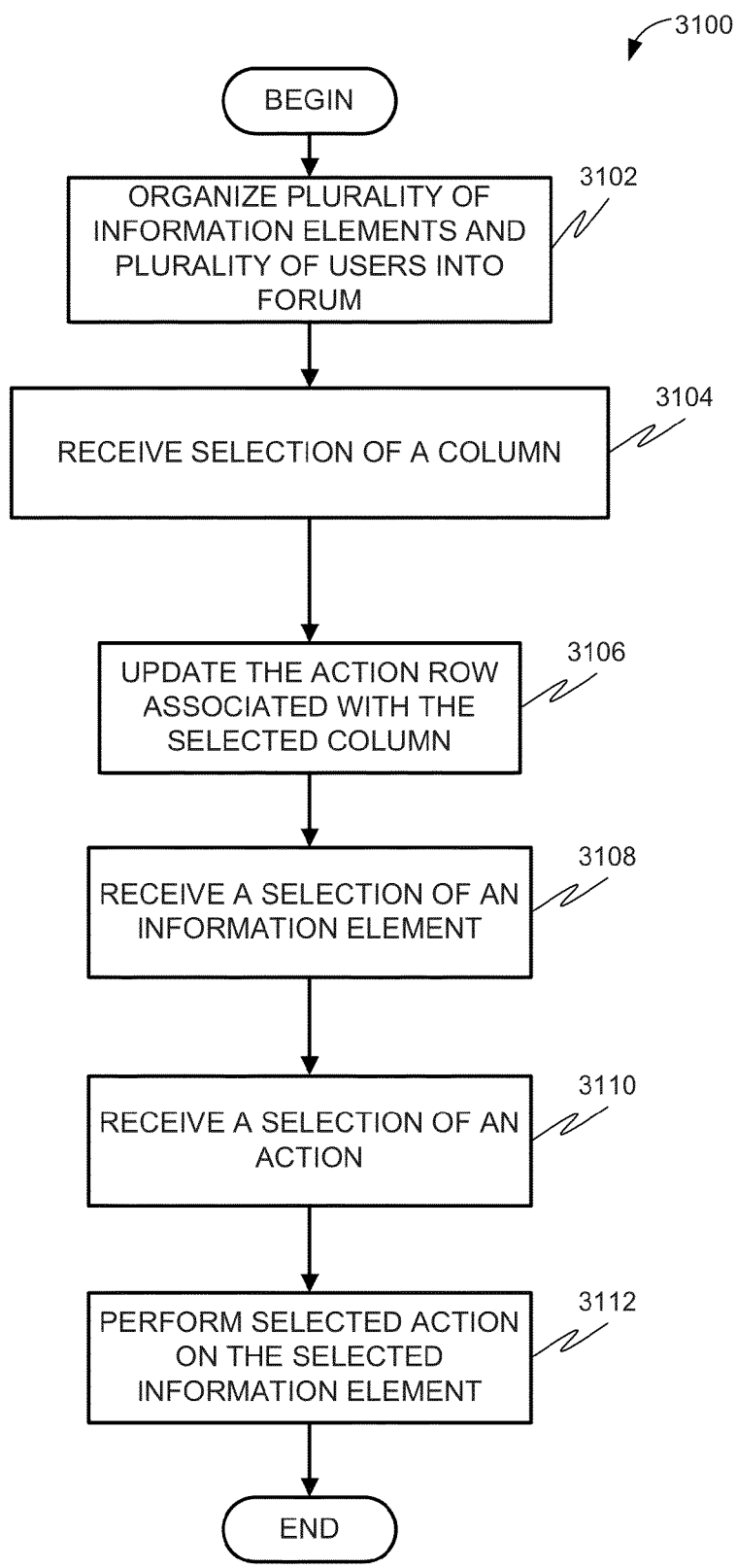
FIG. 31 is a flow diagram illustrating a method, in accordance with an example embodiment, of managing communications relationships.

FIG. 31 is a flow diagram illustrating a method 3100, in accordance with an example embodiment, of managing communications relationships. At operation 3102, a plurality of information elements and a plurality of users are organized into a forum. The forum is a virtual data structure organizing a plurality of single page views, with each of the single page views organized into columns and each column having a home row, a header row, and an action row. The header row indicates a title of the column for each of the columns of a single page view, and the action row indicates one or more commands available for execution for each column of the single page view, with the home row being the same for every column of each of the single page views and including a selectable area that, upon selection by a user, navigates to a single page view associated with a home page view.

At operation 3104, a selection of a column in a selected single page view is received. At operation 3106, in response to the receiving of the selection of the column, the action row associated with the selected column is updated to indicate available actions to be performed on information elements in the selected column. At operation 3108, a selection of an information element in the selected column of the selected single page view is received. At operation 3110, a selection of an action from the action row of the selected column of the selected single page view is received. At 3112, the selected action is performed on the selected information element.

Figure 32:
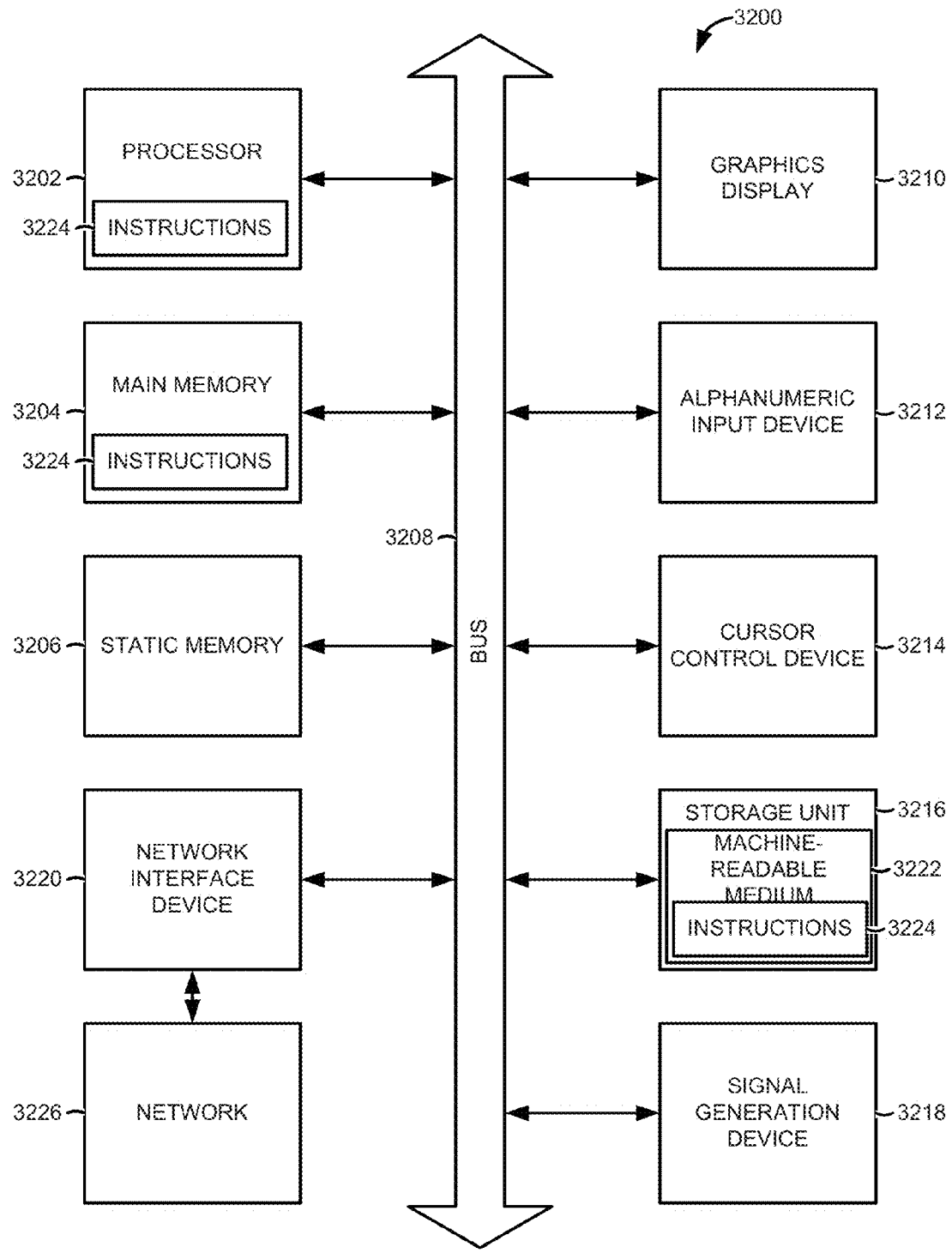
FIG. 32 is a block diagram of a machine in the form of a computer system within which a set of instructions may be executed for causing the machine to perform any one or more of the methodologies discussed herein.

FIG. 32 is a block diagram of a machine in the form of a computer system within which a set of instructions may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In one embodiment, the machine will be a server computer; however, in alternative embodiments, the machine may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 3200 includes a processor 3202 (e.g., a central processing unit (CPU), a graphics processing unit (GPU) or both), a main memory 3204 and a static memory 3206, which communicate with each other via a bus 3208. The computer system 3200 may further include a display unit 3210, an alphanumeric input device 3212 (e.g., a keyboard), and a user interface navigation (e.g., cursor control) device 3214 (e.g., a mouse). In one embodiment, the display unit 3210, input device 3212, and cursor control device 3214 are a touch screen display. The computer system 3200 may additionally include a storage device (e.g., drive unit) 3216, a signal generation device 3218 (e.g., a speaker), a network interface device 3220, and one or more sensors (not pictured), such as a Global Positioning System (GPS) sensor, compass, accelerometer, or other sensor.

The drive unit 3216 includes a machine-readable medium 3222 on which is stored one or more sets of data structures and instructions 3224 (e.g., software) embodying or utilized by any one or more of the methodologies or functions described herein. The instructions 3224 may also reside, completely or at least partially, within the main memory 3204 and/or within the processor 3202 during execution thereof by the computer system 3200, with the main memory 3204 and the processor 3202 also constituting machine-readable media.

While the machine-readable medium 3222 is illustrated in an example embodiment to be a single medium, the term "machine-readable medium" may include a single medium or multiple media (e.g., a centralized or distributed database, and/or associated caches and servers) that store the one or more instructions 3224. The term "machine-readable medium" shall also be taken to include any tangible medium that is capable of storing, encoding, or carrying instructions for execution by the machine and that cause the machine to perform any one or more of the methodologies of the example embodiments, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The instructions 3224 may further be transmitted or received over a communications network 3226 using a transmission medium via the network interface device 3220 utilizing any one of a number of well-known transfer protocols (e.g., HTTP). Examples of communication networks include a local area network (LAN), a WAN, the Internet, mobile telephone networks, POTS networks, and wireless data networks (e.g., Wi-Fi® and WiMAX® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A method of managing communications relationships, the method comprising:
    organizing a plurality of information elements and a plurality of users into a forum, the forum being a virtual data structure organizing a plurality of single page views, each of the single page views organized into columns, each column having a home row, a header row, and an action row, the header row indicating a title of the column for each of the columns of a single page view, and the action row indicating one or more commands available for execution for the each column of the single page view, the home row being the same for every column of each of the single page views and including a selectable area that, upon selection by a user, navigates to a single page view associated with a home page view;
    receiving a selection of a column in a selected single page host view;
    in response to the receiving of the selection of the column, updating the action row associated with the selected column to indicate available actions to be performed on information elements in the selected column;
    receiving a selection of an information element in the selected column of the selected single page view;
    receiving a selection of an action from the action row of the selected column of the selected single page view; and
    performing the selected action on the selected information element.

2. The method of claim 1, wherein one of the users organized in the forum is a host, the host controlling access to the forum by others of the users, the others of the users being guests.

3. The method of claim 1, wherein the information elements include documents.

4. The method of claim 1, wherein the information elements include groups.

5. The method of claim 1, wherein the information elements include dates.

6. The method of claim 1, wherein the information elements include conversations.

7. The method of claim 1, wherein the single page view associated with the home page view provides a selectable column associated with forums hosted by a user and a selectable column associated with forums viewable by the user as a guest.

8. The method of claim 1, wherein the forum is associated with a project.

9. The method of claim 1, wherein the selected single page view includes a column identifying guests of the forum, a column identifying groups of the forum, a column identifying dates of the forum, a column identifying conversations of the forum, and a column indicating guests submitting information elements to the column.

10. A system comprising:
    a user database storing information about a plurality of users;
    an object database storing a plurality of information elements; and
    an application server comprising a server computer configured to:
    organize a plurality of the information elements and a plurality of the users into a forum, the forum being a virtual data structure organizing a plurality of single page views, each of the single page views organized into columns, each column having a home row, a header row, and an action row, the header row indicating a title of the column for each of the columns of a single page view, and the action row indicating one or more commands available for execution for the each column of the single page view, the home row being the same for every column of each of the single page views and including a selectable area that, upon selection by a user, navigates to a single page view associated with a home page view;
    receiving a selection of a column in a selected single page host view;
    in response to the receiving of the selection of the column, updating the action row associated with the selected column to indicate available actions to be performed on information elements in the selected column;
    receiving a selection of an information element in the selected column of the selected single page view;
    receiving a selection of an action from the action row of the selected column of the selected single page view; and
    performing the selected action on the selected information element.

11. The system of claim 10, wherein the information elements are encrypted and decrypted by an encryption system.

12. The system of claim 11, wherein the selected action is to view an information element and the application server is further configured to, in response to the receiving of the selected action, request a paired key and a user key from the user database, to utilize the encryption system to generate an object key using the paired key and the user key, and to decrypt the information element using the object key.

13. The system of claim 10, wherein the receiving of a selection of a column, receiving a selection of an information element, and receiving a selection of an action are all performed by receiving commands from a user interface operating on a client device.

14. The system of claim 12, wherein the user interface is a web browser.

15. A non-transitory computer-readable storage medium comprising instructions that, when executed by at least one processor of a machine, cause the machine to perform operations of managing communications relationships, the method comprising:

organizing a plurality of information elements and a plurality of users into a forum, the forum being a virtual data structure organizing a plurality of single page views, each of the single page views organized into columns, each column having a home row, a header row, and an action row, the header row indicating a title of the column for each of the columns of a single page view, and the action row indicating one or more commands available for execution for the each column of the single page view, the home row being the same for every column of each of the single page views and including a selectable area that, upon selection by a user, navigates to a single page view associated with a home page view;

receiving a selection of a column in a selected single page host view;

in response to the receiving of the selection of the column, updating the action row associated with the selected column to indicate available actions to be performed on information elements in the selected column;

receiving a selection of an information element in the selected column of the selected single page view;

receiving a selection of an action from the action row of the selected column of the selected single page view; and performing the selected action on the selected information element.

16. The non-transitory computer-readable storage medium of claim 15, wherein one of the users organized in the forum is a host, the host controlling access to the forum to others of the users, the others of the users being guests.

17. The non-transitory computer-readable storage medium of claim 15, wherein the information elements include documents.

18. The non-transitory computer-readable storage medium of claim 15, wherein the information elements include groups.

19. The non-transitory computer-readable storage medium of claim 15, wherein the information elements include dates.

20. The non-transitory computer-readable storage medium of claim 15, wherein the information elements include conversations.

21. The non-transitory computer-readable storage medium of claim 15, wherein the single page view associated with the home page view provides a selectable column associated with forums hosted by a user and a selectable column associated with forums viewable by the user as a guest.

22. The non-transitory computer-readable storage medium of claim 15, wherein the forum is associated with a project.

23. The non-transitory computer-readable storage medium of claim 15, wherein the selected single page view includes a column identifying guests of the forum, a column identifying groups of the forum, a column identifying dates of the forum, a column identifying conversations of the forum, and a column indicating guests submitting information elements to the column.

\* \* \* \* \*